US011514536B2

(12) United States Patent
Sharp et al.

(10) Patent No.: US 11,514,536 B2
(45) Date of Patent: Nov. 29, 2022

(54) SYSTEMS AND METHODS FOR PROVIDING A COMMUNITY-BASED DATING SERVICE FOR A SOCIAL NETWORKING SYSTEM

(71) Applicant: Meta Platforms, Inc., Menlo Park, CA (US)

(72) Inventors: Nathan Andrew Sharp, San Francisco, CA (US); Xue Ding, Los Altos, CA (US); Qiang Wang, Redwood City, CA (US); Jordan Springstroh, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/398,145

(22) Filed: Apr. 29, 2019

(65) Prior Publication Data

US 2019/0392008 A1 Dec. 26, 2019

Related U.S. Application Data

(60) Provisional application No. 62/720,493, filed on Aug. 21, 2018, provisional application No. 62/665,478, (Continued)

(51) Int. Cl.
*G06Q 50/00* (2012.01)
*G06F 16/9535* (2019.01)
(Continued)

(52) U.S. Cl.
CPC ............ *G06Q 50/01* (2013.01); *G06F 3/0482* (2013.01); *G06F 9/451* (2018.02); (Continued)

(58) Field of Classification Search
CPC ...... H04L 51/32; G06F 16/9535; G06Q 50/01
(Continued)

(56) References Cited

U.S. PATENT DOCUMENTS 7,085,806 B1* 8/2006 Shapira ................. G06Q 30/08
705/1.1
D575,792 S 8/2008 Benson
(Continued)

FOREIGN PATENT DOCUMENTS

WO 2019/212834 A1 11/2019
WO 2019/213124 A1 11/2019
WO 2019/213127 A1 11/2019

OTHER PUBLICATIONS www.w3schools.com, WC.CSS Accordions, 2016, retreived from https://web.archive.org/web/20160421202932/https://www.w3schools.com/w3css/w3css_accordions.asp (Year: 2016).*
(Continued)

*Primary Examiner* — Lynda Jasmin
*Assistant Examiner* — Joshua D Schneider
(74) *Attorney, Agent, or Firm* — FisherBroyles, LLP

(57) ABSTRACT

A disclosed computer-implemented method may include determining that a user of a social networking system is a participant in a dating service of the social networking system. The method may also include identifying a set of interest-based communities of the social networking system of which the user is a member and that include an activated community-based dating feature. The method may also include selecting a set of additional participants in the dating service. Each additional participant included in the set of additional participants may be an additional member of at least one interest-based community included in the set of interest-based communities. The method may also include presenting, within a dating interface of the social networking system, dating information associated with at least a portion of the set of additional participants. Various other methods, systems, and computer-readable media are also disclosed.

20 Claims, 20 Drawing Sheets

Related U.S. Application Data filed on May 1, 2018, provisional application No. 62/575,128, filed on Oct. 20, 2017.

(51) Int. Cl.
  *G06F 9/451* (2018.01)
  *G06F 16/9536* (2019.01)
  *G06F 16/9538* (2019.01)
  *G06F 3/0482* (2013.01)
  *H04L 51/52* (2022.01)

(52) U.S. Cl.
  CPC ...... *G06F 16/9535* (2019.01); *G06F 16/9536* (2019.01); *G06F 16/9538* (2019.01); *H04L 51/52* (2022.05)

(58) Field of Classification Search
  USPC .......................................................... 705/319
  See application file for complete search history.

(56) References Cited

U.S. PATENT DOCUMENTS

| | | |
|---|---|---|
| D597,101 S | 7/2009 | Chaudhri et al. |
| D599,813 S | 9/2009 | Hirsch |
| D603,416 S | 11/2009 | Poling et al. |
| D622,283 S | 8/2010 | Van Os |
| D624,556 S | 9/2010 | Chaudhri |
| D626,134 S | 10/2010 | Chaudhri |
| D633,918 S | 3/2011 | Vance et al. |
| D633,921 S | 3/2011 | Brinda |
| D636,400 S | 4/2011 | Vance et al. |
| D638,853 S | 5/2011 | Brinda |
| D640,274 S | 6/2011 | Arnold |
| D640,276 S | 6/2011 | Woo |
| D650,393 S | 12/2011 | Doll |
| D652,050 S | 1/2012 | Chaudhri |
| D657,378 S | 4/2012 | Vance et al. |
| D658,679 S | 5/2012 | Davydov et al. |
| D661,312 S | 6/2012 | Vance et al. |
| D668,665 S | 10/2012 | Chen et al. |
| 8,295,851 B2 | 10/2012 | Finnegan et al. |
| D670,724 S | 11/2012 | Mori et al. |
| D671,135 S | 11/2012 | Arnold et al. |
| D671,140 S | 11/2012 | Guss et al. |
| D671,553 S | 11/2012 | Frijlink et al. |
| D673,169 S | 12/2012 | Arnold et al. |
| D677,691 S | 3/2013 | Frijlink |
| D679,730 S | 4/2013 | Tyler et al. |
| D682,292 S | 5/2013 | Mori et al. |
| D682,870 S | 5/2013 | Roberts et al. |
| D682,872 S | 5/2013 | Frijlink |
| D683,738 S | 6/2013 | Wujcik et al. |
| D686,221 S | 7/2013 | Brinda et al. |
| D686,231 S | 7/2013 | Rodenhouse et al. |
| D686,634 S | 7/2013 | Malasani et al. |
| D687,446 S | 8/2013 | Arnold et al. |
| D687,840 S | 8/2013 | Arnold et al. |
| D689,510 S | 9/2013 | Rodrigues et al. |
| D691,164 S | 10/2013 | Lim et al. |
| D692,910 S | 11/2013 | Anzures et al. |
| D695,754 S | 12/2013 | Woo-Seok et al. |
| D699,740 S | 2/2014 | Woo |
| D699,743 S | 2/2014 | Arnold et al. |
| D701,868 S | 4/2014 | Chaudhri |
| D704,211 S | 5/2014 | Agnew et al. |
| D709,080 S | 7/2014 | Kim |
| D711,402 S | 8/2014 | Thornton et al. |
| D711,406 S | 8/2014 | Hurd et al. |
| D714,816 S | 10/2014 | Varon |
| D720,765 S | 1/2015 | Xie et al. |
| D725,666 S | 3/2015 | Tseng et al. |
| D725,670 S | 3/2015 | Zhang et al. |
| D727,930 S | 4/2015 | Kim et al. |
| D728,601 S | 5/2015 | Angelides |
| D729,263 S | 5/2015 | Ahn et al. |
| D730,367 S | 5/2015 | Ryan et al. |
| D732,049 S | 6/2015 | Amin |
| D732,062 S | 6/2015 | Kwon |
| D733,175 S | 6/2015 | Bae |
| D734,350 S | 7/2015 | Inose et al. |
| D735,234 S | 7/2015 | Chae et al. |
| D735,742 S | 8/2015 | Lee et al. |
| D736,246 S | 8/2015 | Zhang et al. |
| D736,247 S | 8/2015 | Chen et al. |
| D736,248 S | 8/2015 | Chen et al. |
| D736,808 S | 8/2015 | Soegiono et al. |
| D736,815 S | 8/2015 | Niijima et al. |
| D737,283 S | 8/2015 | Scalisi |
| D737,833 S | 9/2015 | Anzures et al. |
| D738,902 S | 9/2015 | Roberts et al. |
| D739,870 S | 9/2015 | Roberts et al. |
| D743,434 S | 11/2015 | Chaudhri |
| D744,502 S | 12/2015 | Wilberding et al. |
| D744,503 S | 12/2015 | Wilberding et al. |
| D744,504 S | 12/2015 | Wilberding et al. |
| D744,520 S | 12/2015 | McLaughlin et al. |
| D745,052 S | 12/2015 | Um et al. |
| D745,546 S | 12/2015 | Johnson et al. |
| D746,861 S | 1/2016 | Park et al. |
| D749,604 S | 2/2016 | Trousdell et al. |
| D749,608 S | 2/2016 | Bae |
| D749,625 S | 2/2016 | Yang et al. |
| D752,604 S | 3/2016 | Zhang |
| D753,702 S | 4/2016 | Zhou |
| D754,689 S | 4/2016 | Lee |
| D754,690 S | 4/2016 | Park et al. |
| D754,719 S | 4/2016 | Zha |
| D755,212 S | 5/2016 | Bae |
| D755,215 S | 5/2016 | Lee et al. |
| D755,216 S | 5/2016 | Lee et al. |
| D755,830 S | 5/2016 | Chaudhri et al. |
| D759,723 S | 6/2016 | Butcher et al. |
| D760,768 S | 7/2016 | Um et al. |
| D760,773 S | 7/2016 | Cho et al. |
| D761,294 S | 7/2016 | Weeresinghe |
| D761,818 S | 7/2016 | Jung et al. |
| D762,696 S | 8/2016 | Chen |
| D763,271 S | 8/2016 | Everette et al. |
| D763,275 S | 8/2016 | Loosli et al. |
| D763,870 S | 8/2016 | Kim |
| D763,882 S | 8/2016 | Liang |
| D763,898 S | 8/2016 | Raykovich et al. |
| D765,110 S | 8/2016 | Liang |
| D765,118 S | 8/2016 | Bachman et al. |
| D765,698 S | 9/2016 | Kwon |
| D767,621 S | 9/2016 | Gagnier |
| D768,642 S | 10/2016 | Li et al. |
| D768,676 S | 10/2016 | Edwards et al. |
| D769,888 S | 10/2016 | Li et al. |
| D770,487 S | 11/2016 | Li |
| D770,488 S | 11/2016 | Li |
| D772,906 S | 11/2016 | Fu |
| D772,909 S | 11/2016 | Chen |
| D772,918 S | 11/2016 | Van den Berg et al. |
| D773,516 S | 12/2016 | Sun |
| D776,126 S | 1/2017 | Lai et al. |
| D776,147 S | 1/2017 | Simmons et al. |
| D777,195 S | 1/2017 | Dain et al. |
| D777,741 S | 1/2017 | Hao et al. |
| D777,745 S | 1/2017 | Ta |
| D777,768 S | 1/2017 | Persson et al. |
| D778,944 S | 2/2017 | Kim |
| D779,516 S | 2/2017 | Pierson et al. |
| D780,775 S | 3/2017 | Rad et al. |
| D781,311 S | 3/2017 | Rad et al. |
| D781,339 S | 3/2017 | Li et al. |
| D781,881 S | 3/2017 | Cornell |
| D781,882 S | 3/2017 | Rad et al. |
| D784,371 S | 4/2017 | Loosli et al. |
| D785,045 S | 4/2017 | Coffman et al. |
| D786,274 S | 5/2017 | Lee et al. |
| D788,139 S | 5/2017 | Lee et al. |
| D788,157 S | 5/2017 | Kim et al. |

(56) References Cited

U.S. PATENT DOCUMENTS

| | | |
|---|---|---|
| D789,388 S | 6/2017 | Gedrich et al. |
| D789,947 S | 6/2017 | Sun |
| D789,949 S | 6/2017 | Sun |
| D789,964 S | 6/2017 | Apodaca et al. |
| D790,569 S | 6/2017 | Anzures et al. |
| D790,589 S | 6/2017 | Hart et al. |
| D791,170 S | 7/2017 | Sun |
| D791,171 S | 7/2017 | Sun |
| D791,818 S | 7/2017 | Sun |
| D792,420 S | 7/2017 | van den Berg et al. |
| D792,427 S | 7/2017 | Weaver et al. |
| D792,446 S | 7/2017 | Sun |
| D792,903 S | 7/2017 | Park et al. |
| D793,406 S | 8/2017 | Kim et al. |
| D793,427 S | 8/2017 | Sun |
| D794,651 S | 8/2017 | Cavander et al. |
| D794,661 S | 8/2017 | Nishizawa et al. |
| D795,893 S | 8/2017 | Kim et al. |
| D795,918 S | 8/2017 | Bischoff et al. |
| D797,132 S | 9/2017 | Rhodes et al. |
| D797,133 S | 9/2017 | Marcolongo et al. |
| D797,769 S | 9/2017 | Li |
| D797,771 S | 9/2017 | Caporal et al. |
| D798,316 S | 9/2017 | Bradley et al. |
| D798,333 S | 9/2017 | Dascola et al. |
| D798,334 S | 9/2017 | Dye et al. |
| D799,504 S | 10/2017 | Chen et al. |
| D803,844 S | 11/2017 | Lee et al. |
| D803,871 S | 11/2017 | Kim |
| D804,520 S | 12/2017 | Kim |
| D805,090 S | 12/2017 | Gouvernel et al. |
| D805,541 S | 12/2017 | Juliano |
| D805,543 S | 12/2017 | Baker |
| D807,387 S | 1/2018 | Cho et al. |
| D807,899 S | 1/2018 | Hilhorst et al. |
| D808,399 S | 1/2018 | Derby et al. |
| D810,762 S | 2/2018 | Guerimand et al. |
| D810,772 S | 2/2018 | Wang et al. |
| D811,433 S | 2/2018 | Dye et al. |
| D812,098 S | 3/2018 | Chung |
| D815,128 S | 4/2018 | Phillips et al. |
| D819,059 S | 5/2018 | O'Toole |
| D819,647 S | 6/2018 | Chen et al. |
| D822,711 S | 7/2018 | Bachman et al. |
| D823,870 S | 7/2018 | Fan |
| D824,409 S | 7/2018 | Harvey et al. |
| D824,416 S | 7/2018 | Memmelaae, Jr. et al. |
| D824,930 S | 8/2018 | Spector |
| D825,590 S | 8/2018 | Sagrillo et al. |
| D826,256 S | 8/2018 | Tsuji et al. |
| D826,968 S | 8/2018 | Varshavskaya et al. |
| D828,370 S | 9/2018 | Lee et al. |
| D828,852 S | 9/2018 | Park et al. |
| D829,219 S | 9/2018 | Bae et al. |
| D830,375 S | 10/2018 | Phillips et al. |
| D833,457 S | 11/2018 | Deng |
| D834,596 S | 11/2018 | Bae et al. |
| D834,597 S | 11/2018 | Bae et al. |
| D834,598 S | 11/2018 | Bae et al. |
| D834,599 S | 11/2018 | Hwang et al. |
| D835,151 S | 12/2018 | Martin et al. |
| D836,124 S | 12/2018 | Fan |
| D838,732 S | 1/2019 | Furdei et al. |
| D839,302 S | 1/2019 | Lu et al. |
| D841,024 S | 2/2019 | Clediere et al. |
| D841,044 S | 2/2019 | Van Den Berg et al. |
| D841,657 S | 2/2019 | Hilhorst et al. |
| D841,660 S | 2/2019 | Mercado |
| D841,667 S | 2/2019 | Coren |
| D841,673 S | 2/2019 | Feit et al. |
| D842,871 S | 3/2019 | Clediere et al. |
| D843,383 S | 3/2019 | Phillips et al. |
| D844,649 S | 4/2019 | Bessette et al. |
| D845,971 S | 4/2019 | Tsurkan et al. |
| D845,977 S | 4/2019 | Mok et al. |
| D845,983 S | 4/2019 | Malahy et al. |
| D846,567 S | 4/2019 | Anzures et al. |
| D846,593 S | 4/2019 | Anzures et al. |
| D848,463 S | 5/2019 | Penha et al. |
| D849,015 S | 5/2019 | Kuroda et al. |
| D849,765 S | 5/2019 | Lee |
| D849,770 S | 5/2019 | Matas |
| D850,469 S | 6/2019 | Malahy et al. |
| D852,215 S | 6/2019 | Westerhold et al. |
| 10,320,734 B1 * | 6/2019 | Mishra .................... H04L 51/32 |
| D854,567 S | 7/2019 | Hu et al. |
| D855,059 S | 7/2019 | Cinek et al. |
| D855,635 S | 8/2019 | Prag et al. |
| D856,347 S | 8/2019 | Cinek et al. |
| D856,357 S | 8/2019 | Naimark et al. |
| D857,038 S | 8/2019 | Phillips et al. |
| D858,546 S | 9/2019 | Haile et al. |
| D858,552 S | 9/2019 | Westerhold et al. |
| D858,555 S | 9/2019 | Krishna |
| D858,556 S | 9/2019 | Krishna |
| D859,446 S | 9/2019 | Westerhold et al. |
| D859,450 S | 9/2019 | Krishna |
| D859,452 S | 9/2019 | Markus et al. |
| D860,249 S | 9/2019 | Shriram et al. |
| D861,024 S | 9/2019 | Clediere et al. |
| D861,719 S | 10/2019 | Van Der Molen |
| D864,231 S | 10/2019 | Gupta |
| D864,991 S | 10/2019 | Seo et al. |
| D866,572 S | 11/2019 | Sagrillo et al. |
| D866,582 S | 11/2019 | Chang et al. |
| D867,382 S | 11/2019 | Wang et al. |
| D867,383 S | 11/2019 | Wang et al. |
| D868,101 S | 11/2019 | Choi et al. |
| D868,808 S | 12/2019 | Hopper et al. |
| D868,824 S | 12/2019 | Chen |
| D870,144 S | 12/2019 | Mensinger et al. |
| D870,742 S | 12/2019 | Cornell |
| D870,744 S | 12/2019 | Gaiser et al. |
| D870,761 S | 12/2019 | Le et al. |
| D871,426 S | 12/2019 | Kim |
| D871,431 S | 12/2019 | Cullum et al. |
| D872,739 S | 1/2020 | Clediere et al. |
| D874,479 S | 2/2020 | Tsurkan et al. |
| D874,496 S | 2/2020 | Jang et al. |
| D874,504 S | 2/2020 | Clediere |
| D875,113 S | 2/2020 | Cldiere |
| D875,120 S | 2/2020 | Ji et al. |
| D875,121 S | 2/2020 | Ji et al. |
| D875,122 S | 2/2020 | Ji et al. |
| D875,123 S | 2/2020 | Ji et al. |
| D875,132 S | 2/2020 | Wang et al. |
| D875,743 S | 2/2020 | Cielak et al. |
| D876,474 S | 2/2020 | Parks et al. |
| D877,185 S | 3/2020 | Cooper et al. |
| D877,750 S | 3/2020 | Stamatiou |
| D877,759 S | 3/2020 | Nishizawa et al. |
| D878,406 S | 3/2020 | Okumura et al. |
| D880,500 S | 4/2020 | Clediere |
| D882,613 S | 4/2020 | Zumbrunnen et al. |
| D882,614 S | 4/2020 | Zumbrunnen et al. |
| D882,619 S | 4/2020 | Frolovichev |
| D882,621 S | 4/2020 | Anzures et al. |
| D883,308 S | 5/2020 | Nesladek et al. |
| D884,009 S | 5/2020 | Hong et al. |
| D884,010 S | 5/2020 | Lenz, Jr. |
| D884,013 S | 5/2020 | Clediere |
| D884,721 S | 5/2020 | Lunaparra et al. |
| D884,724 S | 5/2020 | VanDuyn et al. |
| D884,727 S | 5/2020 | Tsuji et al. |
| D884,733 S | 5/2020 | Cornell |
| D885,410 S | 5/2020 | Butler |
| D885,421 S | 5/2020 | Lunaparra et al. |
| D886,121 S | 6/2020 | Zeng et al. |
| D886,135 S | 6/2020 | Cheng et al. |
| D886,142 S | 6/2020 | Lynne et al. |
| D887,428 S | 6/2020 | Fatnani et al. |
| D889,481 S | 7/2020 | Bae et al. |
| D892,142 S | 8/2020 | Clifford et al. |
| D892,820 S | 8/2020 | Jee et al. |

(56) References Cited

U.S. PATENT DOCUMENTS

| | | | |
|---|---|---|---|
| D892,828 S | 8/2020 | Nesladek et al. | |
| D892,847 S | 8/2020 | Lokhtin et al. | |
| D893,519 S | 8/2020 | Aketa et al. | |
| D893,525 S | 8/2020 | Zhang | |
| D893,528 S | 8/2020 | Wang et al. | |
| D893,539 S | 8/2020 | Zhang | |
| D894,213 S | 8/2020 | Doti et al. | |
| D894,952 S | 9/2020 | Krishna | |
| D894,961 S | 9/2020 | Butler et al. | |
| D898,050 S | 10/2020 | Jedrzejowicz et al. | |
| D898,052 S | 10/2020 | Jang et al. | |
| D899,443 S | 10/2020 | Sharp et al. | |
| D910,032 S | 2/2021 | Sharp et al. | |
| D912,075 S | 3/2021 | Sharp et al. | |
| D920,998 S | 6/2021 | Sharp et al. | |
| D920,999 S | 6/2021 | Sharp et al. | |
| 2006/0287878 A1* | 12/2006 | Wadhwa | G06Q 30/00 705/7.33 |
| 2007/0005750 A1 | 1/2007 | Lunt et al. | |
| 2007/0094609 A1* | 4/2007 | Gilboa | G06F 8/20 715/762 |
| 2008/0030496 A1 | 2/2008 | Lee et al. | |
| 2010/0070577 A1* | 3/2010 | Relyea | G06Q 10/10 709/204 |
| 2010/0185625 A1 | 7/2010 | Johnson et al. | |
| 2010/0251141 A1 | 9/2010 | Sabin et al. | |
| 2011/0219310 A1 | 9/2011 | Robson | |
| 2012/0290978 A1* | 11/2012 | Devecka | H04W 4/21 715/810 |
| 2014/0040368 A1* | 2/2014 | Janssens | H04L 67/306 709/204 |
| 2014/0258260 A1 | 9/2014 | Rayborn | |
| 2014/0279066 A1 | 9/2014 | Louis et al. | |
| 2014/0282099 A1 | 9/2014 | Bronder et al. | |
| 2014/0317189 A1* | 10/2014 | Pedraza | H04L 63/0823 709/204 |
| 2015/0163321 A1 | 6/2015 | Abou Mahmoud et al. | |
| 2015/0172068 A1 | 6/2015 | Kovac | |
| 2015/0213091 A1* | 7/2015 | Laight | H04L 51/32 707/758 |
| 2015/0347411 A1 | 12/2015 | Friggeri et al. | |
| 2015/0356180 A1 | 12/2015 | Filiz | |
| 2016/0004778 A1 | 1/2016 | Finder | |
| 2016/0358214 A1 | 12/2016 | Shalunov et al. | |
| 2017/0300935 A1* | 10/2017 | Herbst | G06Q 30/0201 |
| 2018/0041461 A1 | 2/2018 | Kurani | |
| 2018/0096074 A1* | 4/2018 | Gueye | G06Q 30/02 |
| 2019/0251640 A1 | 8/2019 | Sharp et al. | |
| 2019/0342402 A1 | 11/2019 | Sharp | |
| 2020/0098278 A1 | 3/2020 | Doti et al. | |

OTHER PUBLICATIONS

Sara McCorquodale, "Mutual Appreciation", Guide to Dating, Jan. 28, 2009, retrieved from https://www.theguardian.com/lifeandstyle/2009/jan/24/dating-hobbies-mutual-interests (Year: 2009).*

Sushrut Padhye, "Why You Should Integrate Social Media Platforms into Your App", Guide to Dating, Jan. 19, 2019, retrieved from https://www.socialmediatoday.com/content/why-you-should-integrate-social-media-platforms-your-app (Year: 2015).*

Non-Final Office Action received for U.S. Appl. No. 16/377,774 dated Mar. 23, 2020, 25 pages.

Sharp et al., "Landing Page for A Community-Based Dating Service", U.S. Appl. No. 29/689,783, filed May 1, 2019, 23 pages.

Sharp et al., "Presenting Matches Within a Community-Based Dating Service", U.S. Appl. No. 29/689,785, filed May 1, 2019, 32 pages.

Sharp et al., "Design for a Second-Look Interface for a Community-Based Dating Service", U.S. Appl. No. 29/689,786, filed May 1, 2019, 27 pages.

Sharp et al., "Design for a Match Pausing Interface for a Community-Based Dating Service", U.S. Appl. No. 29/689,787, filed May 1, 2019, 26 pages.

Sharp et al., "Design for a Conversation Starter Interface for a Community-Based Dating Service", U.S. Appl. No. 29/689,789, filed May 1, 2019, 27 pages.

Sharp et al., "Systems and Methods for Providing a Community-Based Dating Service fora Social Networking System", U.S. Appl. No. 16/398,148, filed Apr. 29, 2019, 84 pages.

Henri et al., "Understanding and Analysing Activity and Learning in Virtual Communities", Journal of Computer Assisted Learning, vol. 19, 2003, pp. 474-487.

International Search Report and Written Opinion received for PCT Application Serial No. PCT/US2019/029980 dated Jun. 13, 2019, 9 pages.

International Search Report and Written Opinion received for PCT Application Serial No. PCT/US2019/029987 dated Jun. 13, 2019, 9 pages.

International Search Report and Written Opinion received for PCT Application Serial No. PCT/US2019/029016 dated Jul. 30, 2019, 9 pages.

Notice of Allowance received for U.S. Appl. No. 29/689,785 dated Jun. 16, 2020, 29 pages.

International Preliminary Report on Patentability received for PCT Application Serial No. PCT/US2019/29980 dated Nov. 3, 2020, 8 pages.

International Preliminary Report on Patentability received for PCT Application Serial No. PCT/US2019/029987 dated Nov. 3, 2020, 8 pages.

International Preliminary Report on Patentability received for PCT Application Serial No. PCT/US2019/029016 dated Nov. 3, 2020, 8 pages.

Notice of Allowance received for U.S. Appl. No. 29/689,789 dated Feb. 4, 2021, 31 pages.

Preinterview First Office Action received for U.S. Appl. No. 16/398,148 dated Feb. 25, 2021, 68 pages.

Final Office Action received for U.S. Appl. No. 16/377,774 dated Feb. 25, 2021, 63 pages.

Notice of Allowance received for U.S. Appl. No. 16/377,774 dated May 13, 2021, 47 pages.

Notice of Allowance received for U.S. Appl. No. 29/689,783 dated Feb. 4, 2021, 29 pages.

Notice of Allowance received for U.S. Appl. No. 16/377,774 dated Jul. 26, 2021, 46 pages.

Final Office Action received for U.S. Appl. No. 16/377,774 dated Jul. 10, 2020, 34 pages.

Non-Final Office Action received for U.S. Appl. No. 16/377,774 dated Oct. 23, 2020, 42 pages.

Non-Final Office Action received for U.S. Appl. No. 29/689,783 dated Sep. 18, 2020, 37 pages.

Notice of Allowance received for U.S. Appl. No. 29/689,786 dated Oct. 21, 2020, 38 pages.

Notice of Allowance received for U.S. Appl. No. 29/689,787 dated Sep. 24, 2020, 42 pages.

Non-Final Office Action received for U.S. Appl. No. 29/689,789 dated Sep. 18, 2020, 34 pages.

* cited by examiner

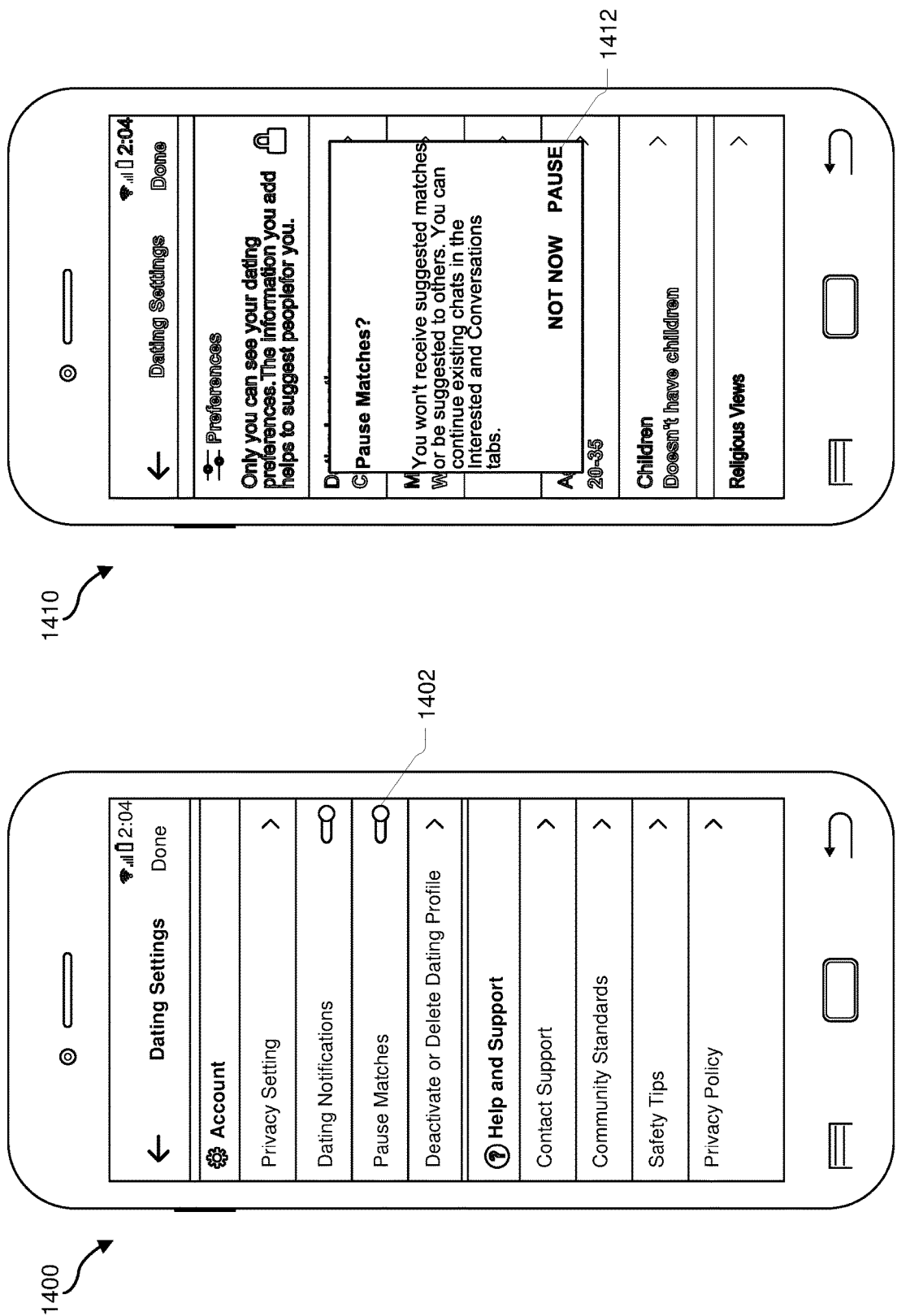

SYSTEMS AND METHODS FOR PROVIDING A COMMUNITY-BASED DATING SERVICE FOR A SOCIAL NETWORKING SYSTEM

CROSS REFERENCE TO RELATED APPLICATION

This application claims the benefit of U.S. Provisional Application No. 62/665,478, filed May 1, 2018, U.S. Provisional Application No. 62/720,493, filed Aug. 21, 2018, and U.S. Provisional Application No. 62/757,128, filed Nov. 7, 2018, the disclosure of each of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 14A-14B and 15 include interface views that illustrate examples of pausing matches within a community-based dating service of a social networking system in accordance with some embodiments described herein.

Figure 1:
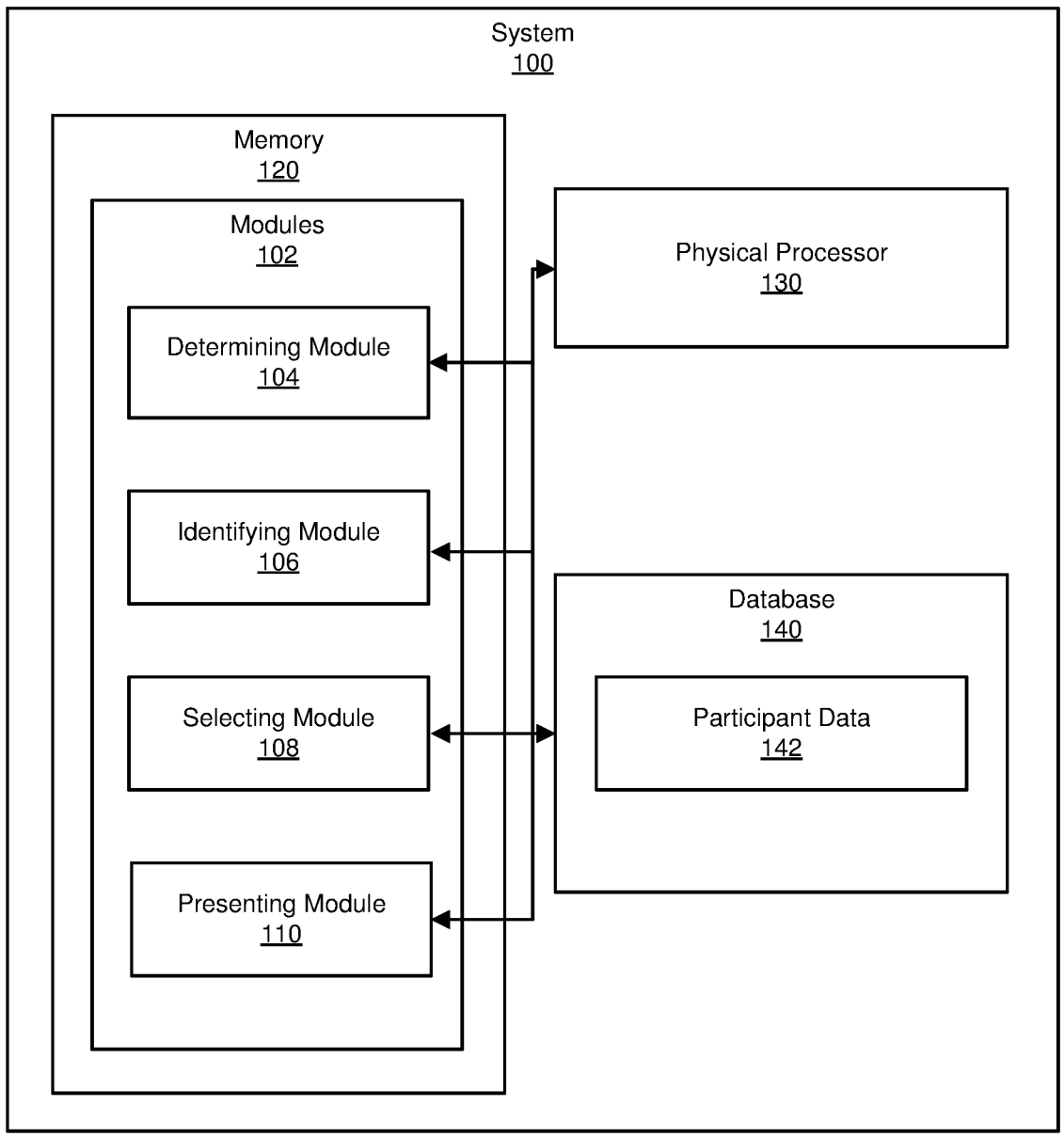
FIG. 1 is a block diagram of an example system for providing a community-based dating service for a social networking system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Modern social networking systems have revolutionized how people connect to and communicate with each other. For example, users of social networking systems may share information (e.g., posts, news stories, media, etc.) with other users, join groups that include other users who share common interests, and so forth. Unfortunately, it may be difficult for users of a social networking system to initiate new relationships with other users of the social networking system.

For example, a user may wish to find a new romantic partner, and therefore may wish to identify other users of the social networking system who may be open to forming a new romantic relationship and with whom the user may be compatible (e.g., socially compatible, romantically compatible, sexually compatible, etc.). While some conventional social networking systems may allow users to form and/or participate in communities of users who share common interests, it may be difficult for a user who is a member of such a user community to identify other members of the community who may be open to forming new relationships and/or who may be otherwise compatible with the user.

Hence, the instant disclosure identifies and addresses a need for new systems and methods for providing a community-based dating service for a social networking system.

The present disclosure is generally directed to systems and methods for providing a community-based dating service for a social networking system. As will be explained in greater detail below, embodiments of the instant disclosure may determine that a user of a social networking system is a participant in a community-based dating service of the social networking system. Embodiments may also identify a set of interest-based communities of the social networking system (e.g., groups, events, pages, etc.) of which the user is a member and that have an activated community-based dating feature. The community-based dating feature may facilitate dating connections between members of the interest-based community. Embodiments may also select a set of additional participants in the dating service who are also members of at least one interest-based community included in the set of interest-based communities and may present, within a dating interface of the social networking system, dating information associated with the set of additional participants. In some examples, such additional participants may be referred to as "matches" of the user within the dating service.

The systems and methods described herein may enable a user of a social networking system to unlock dating features associated with various interest-based communities (e.g., groups, events, etc.) of which they are already members. Such a dating feature may facilitate dating connections between members of interest-based communities of a social networking system (e.g., groups, events, pages, etc.). As members of these interest-based communities may already share at least one common interest (e.g., an interest in a subject associated with the interest-based community), facilitating dating connections between such users may enable the users to make stronger, longer-lasting, and/or more fulfilling dating connections than may be possible through conventional dating services.

To illustrate, if a user is a member of an "I Love Corgis" group and wishes to see if there are members within that group who may be interested in making dating connections with other members of the group, then one or more embodiments of this disclosure may enable the user to opt-in to a dating feature associated with the group. This may enable the user to view dating profiles of other members of the group that have also opted in to participate in the dating feature associated with the group.

Similarly, if a user recently attended a friend's birthday party and met someone that they were interested in making a dating connection with, one or more embodiments of the instant disclosure may enable the user to opt-in to a dating feature associated with an interest-based community associated with the event. This may enable the user to see if the person of interest has also opted in to the dating feature of the interest-based community, which may indicate that the person of interest is also interested in making dating connections with other users who attended the friend's birthday party.

In some examples, the systems and methods disclosed herein may enable a user to decline, hide, or otherwise indicate a desire to not initiate a dating communication with an additional user that the dating service has identified as a potential match. However, the user may later wish to reexamine previous matches, perhaps in order to reevaluate the previous matches for potential dating compatibility. The systems and methods disclosed herein may present a user with a reexamination control that, when selected, may cause one or more systems to present the user with information (e.g., a dating profile) associated with one or more additional users who the dating service previously identified as potentially compatible with the user, but whom the user may have previously declined to initiate a dating communication with. In some examples, the reexamination control may be included in a dating interface. In additional examples, the reexamination control may be included as part of an application management or "settings" interface.

In some embodiments, a user may wish to cause the dating service to refrain from presenting the user with additional matches. For example, the user may have started a relationship with another person and no longer wishes to be presented with additional potential matches. One or more systems may present the user with a match pause control that, when selected by the user, may cause the dating service to refrain from presenting additional matches to the user. In some embodiments, the match pause control may be presented within the dating interface. In additional or alternative embodiments, the match pause control may be included in an application management and/or "settings" interface.

In some examples, the systems and methods disclosed herein may provide one or more features to limit harassment and/or other unwanted communication between users. For example, one or more systems may present, within a dating interface, a conversation starter interface that enables a user to start a conversation with the additional member of the interest-based community regarding at least one conversation starter element included in a set of conversation starter elements. This may provide a convenient way for a user to initiate a conversation (and potentially a dating connection) with another user. Additionally, the conversation starter interface may limit a scope of communication between potential dating connections and may therefore limit and/or reduce potentially harassing behavior.

Furthermore, embodiments of the instant disclosure may provide for a more efficient usage of telecommunications resources (e.g., telecommunications infrastructure, bandwidth, etc.) than traditional dating services. For example, the systems and methods described herein may enable a participant in a dating service of a social networking system to easily identify other participants in the dating service who share common interests with the user. Hence, the participant may discover potential dating connections by accessing dating information associated with such identified participants instead of randomly browsing profile information associated with a potentially larger, less targeted set of participants. This may conserve bandwidth resources of the participant, the social networking system, and/or a telecommunications infrastructure that connects the user to the social networking system.

The following will provide, with reference to FIGS. 1-2 and 4-17, detailed descriptions of systems that may provide a community-based dating service for a social networking system. Detailed descriptions of corresponding computer-implemented methods will also be provided in connection with FIG. 3.

The following will provide, with reference to FIGS. 1-2 and 4-8, detailed descriptions of systems for providing a community-based dating service for a social networking system. Detailed descriptions of corresponding computer-implemented methods will also be provided in connection with FIG. 3.

FIG. 1 is a block diagram of an example system 100 for providing a community-based dating service for a social networking system. As illustrated in this figure, example system 100 may include one or more modules 102 for performing one or more tasks. As will be explained in greater detail below, modules 102 may include a determining module 104 that may determine that a user of a social networking system is a participant in a dating service of the social networking system. Additionally, example system 100 may also include an identifying module 106 that may identify a set of interest-based communities of the social networking system. In some examples, each interest-based community included in the set of interest-based communities may include (1) the user as a member of the interest-based community, and (2) an activated community-based dating feature that facilitates dating connections between members of the interest-based community.

As also shown in FIG. 1, example system 100 may include a selecting module 108 that may select a set of additional participants in the dating service. Each additional participant included in the set of additional participants may be an additional member of at least one interest-based community included in the set of interest-based communities. Additionally, example system 100 may also include a presenting module 110 that presents, within a dating interface of the social networking system, dating information associated with at least a portion of the set of additional participants.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate providing a community-based dating service for a social networking system. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also illustrated in FIG. 1, example system 100 may also include one or more stores of data, such as data store 140. In at least one example, data store 140 may include participant data 142 that may include information associated with users who are participating in a dating service of the social networking system. For example, participant data 142 may include data associated with membership of one or more interest-based communities. Furthermore, in some examples, participant data 142 may also include, without limitation, data associated with one or more attributes of a participant in a dating service of the social networking system and/or data associated with a compatibility level (e.g., an interpersonal compatibility level, a dating compatibility level, etc.) of at least two participants in the dating service. Data store 140 may represent portions of a single data store or computing device or a plurality of data stores or computing devices. In some embodiments, data store 140 may be a logical container for data and may be implemented in various forms (e.g., a database, a file, file system, a data structure, etc.). Examples of data store 140 may include, without limitation, one or more files, file systems, data stores, databases, and/or database management systems such as an operational data store (ODS), a relational database, a NoSQL database, a NewSQL database, and/or any other suitable organized collection of data.

Figure 2:
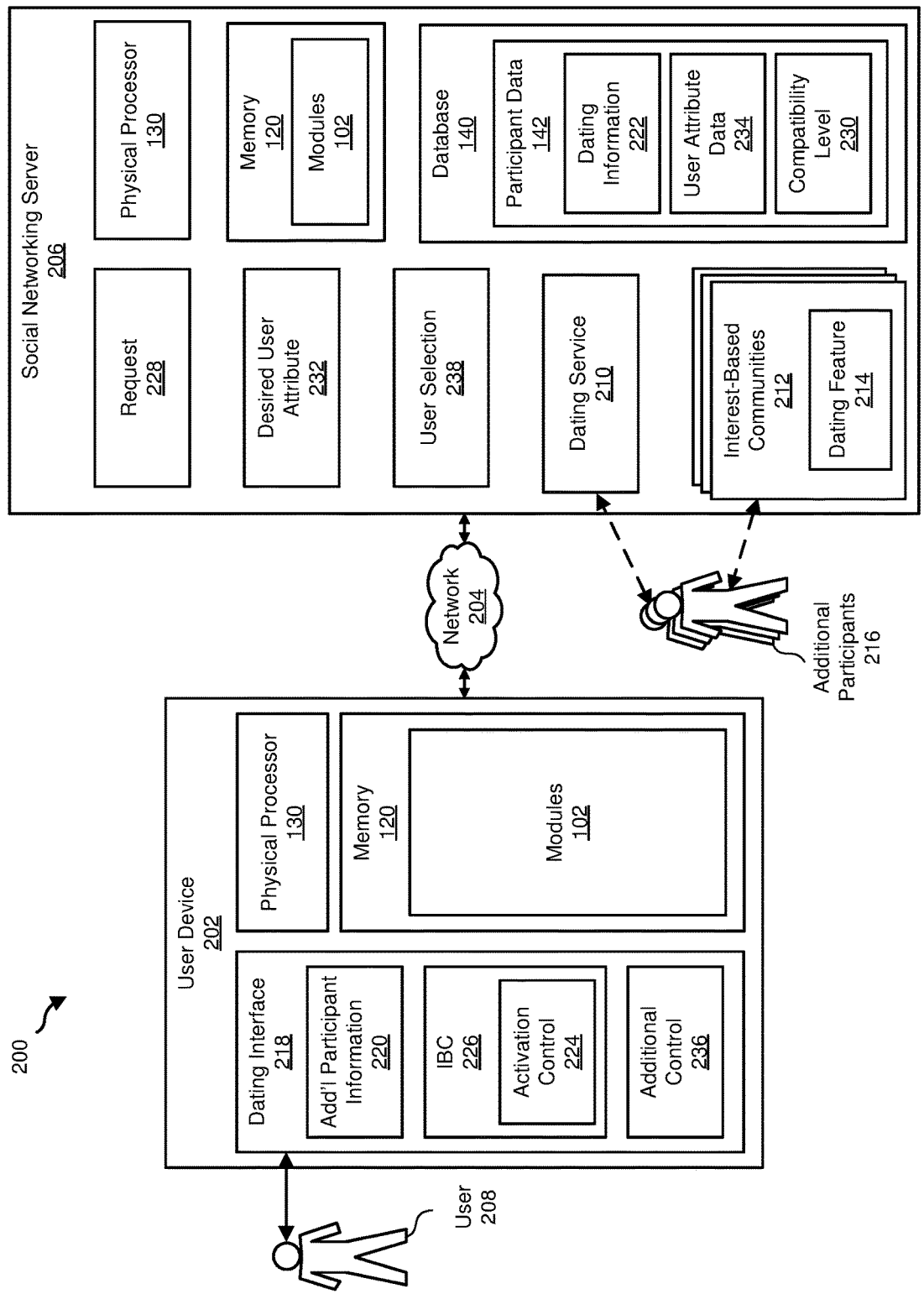
FIG. 2 is a block diagram of an example implementation of a system for providing a community-based dating service for a social networking system.

Example system 100 in FIG. 1 may be implemented in a variety of ways. For example, all or a portion of example system 100 may represent portions of an example system 200 ("system 200") in FIG. 2. As shown in FIG. 2, system 200 may include user device 202 in communication with a social networking server 206 ("server 206") via network 204. In at least one example, server 206 may be programmed with one or more of modules 102. Additionally or alternatively, user device 202 may be programmed with one or more of modules 102.

In at least one embodiment, one or more modules 102 from FIG. 1 may, when executed by user device 202 and/or server 206, enable user device 202 and/or server 206 to perform one or more operations to provide a community-based dating service for a social networking system. For example, as will be described in greater detail below, determining module 104 may cause user device 202 and/or server 206 to determine that a user (e.g., user 208) of a social networking system (e.g., a social networking system provided by social networking server 206) is a participant in a dating service (e.g., dating service 210) of the social networking system.

Additionally, identifying module 106 may cause user device 202 and/or server 206 to identify a set of interest-based communities of the social networking system (e.g., interest-based communities 212). Each interest-based community included in the set of interest-based communities may include (1) the user as a member of the interest-based community, and (2) an activated community-based dating feature (e.g., dating feature 214) that facilitates dating connections between members of the interest-based community.

Furthermore, selecting module 108 may cause user device 202 and/or server 206 to select a set of additional participants (e.g., additional participants 216) in the dating service. Each additional participant included in the set of additional participants may include an additional member of at least one interest-based community included in the set of interest-based communities. Moreover, presenting module 110 may cause user device 202 and/or server 206 to present, within a dating interface (e.g., dating interface 218) of the social network system, dating information (e.g., additional participant information 220 accessed from dating information 222 included in participant data 142) associated with at least a portion of the set of additional participants.

In at least some embodiments, one or more modules 102 (e.g., presenting module 110) may present, within the dating interface of the social networking system, an activation control (e.g., activation control 224) associated with a representation of an interest-based community (e.g., interest-based community 226, or "IBC 226" in FIG. 2) included in the set of interest-based communities. In one or more embodiments, one or more of modules 102 (e.g., presenting module 110) may receive, via the activation control, a request (e.g., request 228) from the user to include the interest-based community in the set of interest-based communities of the social networking system. One or more of modules 102 (e.g., selecting module 108) may select the set of additional participants by including, based on receiving the request from the user via the activation control, members of the interest-based community who are also participants in the dating service in the set of additional participants in the dating service.

Moreover, in some embodiments, one or more of modules 102 (e.g., selecting module 108) may select the set of additional participants in the dating service by, for each participant in the dating service included in at least one interest-based community included in the set of interest-based communities, determining whether the user and the additional participant have at least a threshold level of compatibility (e.g., compatibility level 230 that may be included as part of participant data 142) within the dating service. Upon determining that the user and the additional participant have at least the threshold level of compatibility within the dating service, one or more of modules 102 (e.g., selecting module 108) may include the additional participant in the set of additional participants. Upon determining that the user and the additional participant do not have at least the threshold level of compatibility within the dating service, one or more of modules 102 (e.g., selecting module 108) may exclude the additional participant from the set of additional participants.

Additionally, in one or more embodiments, one or more of modules 102 (e.g., selecting module 108) may select the set of additional participants in the dating service by (1) obtaining, from the user, data representative of at least one desired user attribute (e.g., desired user attribute 232) for new user connections, and (2) for each member of the interest-based community included in the set of interest-based communities, determining whether the additional participant shares the desired user attribute (e.g., by accessing user attribute data 234 that may be included as part of participant data 142). Upon determining that the additional participant shares the desired user attribute, one or more of modules 102 (e.g., selecting module 108) may include the additional participant in the set of additional participants, and upon determining that the additional participant does not share the desired user attribute, may exclude the additional participant from the set of additional participants.

In additional embodiments, one or more of modules 102 (e.g., selecting module 108, presenting module 110, etc.) may present one or more additional controls (e.g., additional control 236) within one or more interfaces that may enable a user to access, enable, activate, and/or use one or more features of the community-based dating service. For example, presenting module 110 may further identify a set of declined participants associated with the user in the dating service. Presenting module 110 may further present a reexamination control within the dating interface or an application management interface. Presenting module 110 may then receive a user selection (e.g., user selection 238) of the reexamination control. Presenting module 110 may then present, within the dating interface in response to receiving the user selection of the reexamination control, dating information associated with the set of declined participants associated with the user. Additional examples of controls and user selections will be provided in reference to FIGS. 4-17 below.

User device 202 generally represents any type or form of computing device capable of reading and/or executing computer-executable instructions. In at least one embodiment, user device 202 may accept one or more directions from server 206. Examples of user device 202 include, without limitation, servers, desktops, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between user device 202 and/or server 206. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, and the like. Network 204 may facilitate communication or data transfer using wireless or wired connections. In one embodiment, network 204 may facilitate communication between user device 202 and server 206.

Server 206 generally represents any type or form of computing device capable of reading and/or executing computer-executable instructions and/or hosting executables. Examples of server 206 include, without limitation, application servers, storage servers, database servers, web servers, and/or any other suitable computing device configured to run certain software applications and/or provide various application, storage, and/or database services.

In at least one example, user device 202 and server 206 may be computing devices programmed with one or more of modules 102. All or a portion of the functionality of modules 102 may be performed by user device 202, server 206, and/or any other suitable computing system. As will be described in greater detail below, one or more of modules 102 from FIG. 1 may, when executed by at least one processor of user device 202 and/or server 206, may enable user device 202 and/or server 206 to provide a community-based dating service for a social networking system.

Many other devices or subsystems may be connected to example system 100 in FIG. 1 and/or example system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Example systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
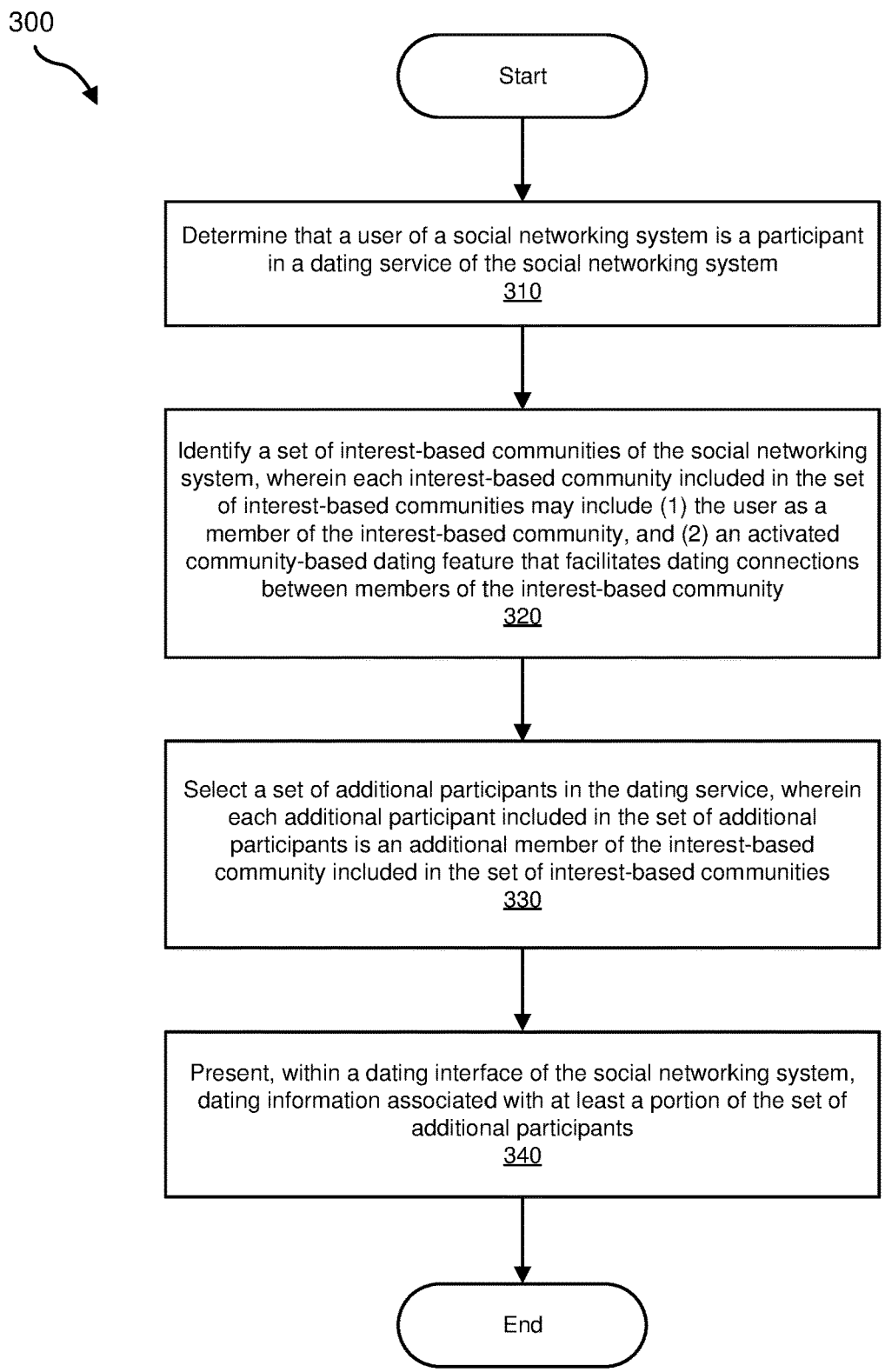
FIG. 3 is a flow diagram of an example method for providing a community-based dating service for a social networking system.

FIG. 3 is a flow diagram of an example computer-implemented method 300 for allocating shared resources in multi-tenant environments. The steps shown in FIG. 3 may be performed by any suitable computer-executable code and/or computing system, including example system 100 in FIG. 1, example system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may determine that a user of a social networking system is a participant in a dating service of the social networking system. For example, determining module 104 may, as part of user device 202 and/or server 206 in FIG. 2, cause user device 202 and/or server 206 to determine that user 208 of a social networking system (e.g., a social networking system hosted by, provided by, enabled by, etc. server 206) is a participant in dating service 210.

In some examples, a dating service or a dating service within a social networking system may include any service of a social networking system that manages dating connections and/or shares, compiles, formats, and/or broadcasts information based on dating connections. In some examples, a dating connection and/or a connection within a dating service may be any social connection between at least two participants of a dating service of a social networking system that represents an interest by at least one of the participants in engaging in dating practices with the other participant or participants.

Determining module 104 may determine that user 208 is a participant in dating service 210 in a variety of contexts. For example, as described above, participant data 142 as maintained by data store 140 may include information associated with participants a dating service of a social networking system such as dating service 210. Hence, participant data 142 may include one or more indicators (e.g., a data field, a database record, a file, portions of one or more of the same, etc.) that may indicate that user 208 is a participant in dating service 210. Determining module 104 may therefore determine that user 208 is a participant in dating service 210 by accessing participant data 142 and/or by analyzing participant data 142 to identify one or more such indicators that may be included in participant data 142.

Returning to FIG. 3, at step 320, one or more of the systems described herein may identify a set of interest-based communities of the social networking system, wherein each interest-based community included in the set of interest-based communities may include (1) the user as a member of the interest-based community, and (2) an activated community-based dating feature that facilitates dating connections between members of the interest-based community. For example, identifying module 106 may, as part of user device 202 and/or server 206 in FIG. 2, identify set of interest-based communities 212 that each include (1) user 208 as a member of the interest-based community, and (2) an activated community-based dating feature 214.

In some examples, a dating service or a dating service within a social networking system may be any service of a social networking system that manages dating connections and/or shares, compiles, formats, and/or broadcasts information based on dating connections. In some examples, a dating connection and/or a connection within a dating service may be any social connection between at least two participants of a dating service of a social networking system that represents an interest by at least one of the participants in engaging in dating practices with the other participant or participants.

In some examples, an interest-based community and/or an interest-based community of a social networking system may include a gathering of people assembled around a subject of common interest. Examples of subjects of common interest may include, without limitation, persons, events, places, physical objects, virtual objects, concepts, themes, problems, propositions, expressions, fields, businesses, organizations, issues, works, and so forth. In some examples, a social networking system may provide one or more features that may facilitate users of the social networking system forming, maintaining, managing, administering, joining, and/or engaging with interest-based communities. For example, a social networking system may provide a "groups" feature that may enable one or more users to establish, join, interact with, and/or administer an interest-based community surrounding a particular subject. Additionally or alternatively, a social networking system may provide an "events" feature that may enable one or more users to establish, join, interact with, and/or administer an interest-based community surrounding a particular event, such as a concert, a social gathering, a meeting, and so forth. Furthermore, a social networking system may provide a "pages" feature that may enable one or more users to follow other users.

In some examples, a community-based dating feature, a community-based dating feature of a social networking system, and/or a community-based dating feature associated with an interest-based community may include a feature of a social networking system that facilitates (e.g., establishes, promotes, furthers, expedites, provides tools for, etc.) formation, maintenance, and/or dissolution of dating connections between members of interest-based communities. For example, a community-based dating feature may identify members of an interest-based community who are participants in a dating service of a social networking system to other members of the interest-based community who are also participants in the dating service of the social networking system. This may enable users who share common interests (e.g., users who are both members of an interest-based community) to form dating connections with each other. By facilitating dating connections between users who already share common interests, a community-based dating feature of a social networking system may enable users to form strong, enjoyable, and valuable dating connections with other users of the social networking system more efficiently than via conventional electronic dating systems.

Identifying module 106 may identify set of interest-based communities 212 in a variety of contexts. For example, as described above, participant data 142 as maintained by data store 140 may include information associated with participants a dating service of a social networking system such as dating service 210. Hence, participant data 142 may include one or more indicators (e.g., a data field, a database record, a file, portions of one or more of the same, etc.) that may indicate a set of interest-based communities that include user 208 as a member and that include activated dating feature 214. Identifying module 106 may therefore identify set of interest-based communities 212 by accessing participant data 142 and/or by analyzing participant data 142 to identify one or more such indicators that may be included in participant data 142.

Returning to FIG. 3, at step 330, one or more of the systems described herein may select a set of additional participants in the dating service, wherein each additional participant included in the set of additional participants is an additional member of at least one interest-based community included in the set of interest-based communities. For example, selecting module 108 may select set of additional participants 216, wherein each additional participant in set of additional participants 216 is included in at least one interest-based community included in set of interest-based communities 212 that include user 208 as a member and that have an activated dating feature 214.

Selecting module 108 may select set of additional participants 216 in a variety of contexts. For example, as described above, participant data 142 as maintained by data store 140 may include information associated with participants a dating service of a social networking system such as dating service 210. Hence, participant data 142 may include one or more indicators (e.g., a data field, a database record, a file, portions of one or more of the same, etc.) that may indicate a set of interest-based communities for each additional participant in the dating service, and one or more indicators that may indicate which of those interest-based communities may include activated dating feature 214. Identifying module 106 may therefore identify set of interest-based communities 212 by accessing participant data 142 and/or by analyzing participant data 142 to identify one or more such indicators that may be included in participant data 142.

Selecting module 108 may further select set of additional participants by, for each additional participant in dating service 210 who is also an additional member of at least one interest-based community included in set of interest-based communities 212, determining whether user 208 and the additional participant have at least a threshold level of compatibility within the dating service. In some examples, a level of compatibility and/or a compatibility level may include any metric that may indicate a degree to which two participants of a dating service may be romantically compatible with each other. A level of compatibility may be determined based on any suitable criteria including, without limitation, common attributes (e.g., income, socioeconomic status, religious views, etc.) of user 208 and additional participant, previous dating experiences of user 208 and/or additional participant, previous relationships of user 208 and/or additional participant, and so forth.

For example, a threshold level of compatibility may be 10 compatibility points. user 208 and an additional participant may both be participants of the dating service and may share a particular attribute that may correlate with romantic compatibility, such as a set of common religious views. Based on user 208 and the additional participant sharing this common attribute, the dating service may assign user 208 and additional participant a compatibility level 230 of 10 compatibility points and may store compatibility level 230 as part of participant data 142. In this example, selecting module 108 may identify additional participant by accessing compatibility level 230 included in participant data 142, and determining that compatibility level 230, at 10 compatibility points, meets or exceeds the threshold level of compatibility of 10 compatibility points. Therefore, selecting module 108 may select an additional participant (e.g., include the additional participant in and/or exclude the additional participant from additional participants 216) by determining that user 208 and the additional participant have at least the threshold level of compatibility within the dating service.

Furthermore, participant data 142 may include dating information 222 associated with participants in dating service 210 and may therefore include additional participant information 220 that may include dating information associated with the additional participant. For example, dating information 222 may include, without limitation, a textual message from additional participant to other participants in the dating service, a listing of interests of additional participant, a set of attributes of the additional participant (e.g., physical attributes, geographic location, sexual orientation, sexual identity, religious views, etc.), a set of attributes that additional participant desires in potential dating connections, a media content item (e.g., video, audio, image, text, etc.) associated with and/or selected by additional participant, and so forth.

Hence, selecting module 108 may select an additional participant for inclusion within the set of additional participants to present to user 208 by accessing dating information 222, identifying at least a portion of dating information 222 that may be associated with the additional participant, designating the identified portion of dating information 222 that may be associated with the additional participant as additional participant information 220, transferring additional participant information 220 to user device 202, and/or directing user device 202 to present additional participant information 220 within dating interface 218.

Moreover, in some embodiments, selecting module 108 may select additional participants 216 by obtaining, from user 208, data representative of at least one desired user attribute for new user connections, such as desired user attribute 232. In some examples, a user attribute may be any quality or characteristic that may be associated with a user of a social networking system. In some examples, a user attribute may include, without limitation, a characteristic (e.g., physical, mental, intellectual, etc.), a trait, an aspect, a property, and/or a state. For example, desired user attribute 232 may include an indication that user 208 is located in a particular geographic area and/or wishes to connect with other users in the particular geographic area, an indication that user 208 is employed by a particular employer and/or wishes to connect with other users who are also employed by the particular employer, an indication that user 208 is a participant of a dating service of a social networking system and wishes to connect with other users who are also participants of the dating service, and so forth.

Selecting module 108 may obtain desired user attribute 232 from user 208 in any suitable way. For example, user 208 may submit desired user attribute 232 via a dating interface of a social networking system (e.g., dating interface 218). Obtaining module 106 may then obtain desired user attribute 232 from the user interface via an internal messaging service of the social networking system that facilitates communication among various services, modules, and/or users of the social networking system.

Selecting module 108 may determine that the additional participant possesses desired user attribute 232 in a variety of contexts. For example, selecting module 108 may determine that the additional participant possesses the desired user attribute by accessing user attribute data 234 included in participant data 142 stored in data store 140. Selecting module 108 may then determine that an additional participant in the dating service possesses the desired user attribute based on user attribute data 234 and may select the additional participant for inclusion in additional participants 216 based on that determination.

For example, user 208 may be geographically located in Palo Alto, Calif. desired user attribute 232 may indicate that user 208 desires to connect with other users who are also located in Palo Alto, Calif. User attribute data 234 may indicate that the additional participant is also geographically located in Palo Alto, Calif. Selecting module 108 may access participant data 142, determine that the additional participant possesses the desired user attribute of being geographically located in Palo Alto, Calif. based on user attribute data 234, and may include the additional participant in additional participants 216 and/or exclude the additional participant from additional participants 216 based on that determination.

Returning to FIG. 3, at step 340, one or more of the systems described herein may present, within a dating interface of the social networking system, dating information associated with at least a portion of the set of additional participants. For example, presenting module 110 may, as part of user device 202 and/or server 206, present, within dating interface 218, dating information associated with at least a portion of the set of additional participants (e.g., additional participant information 220).

Figure 4A:
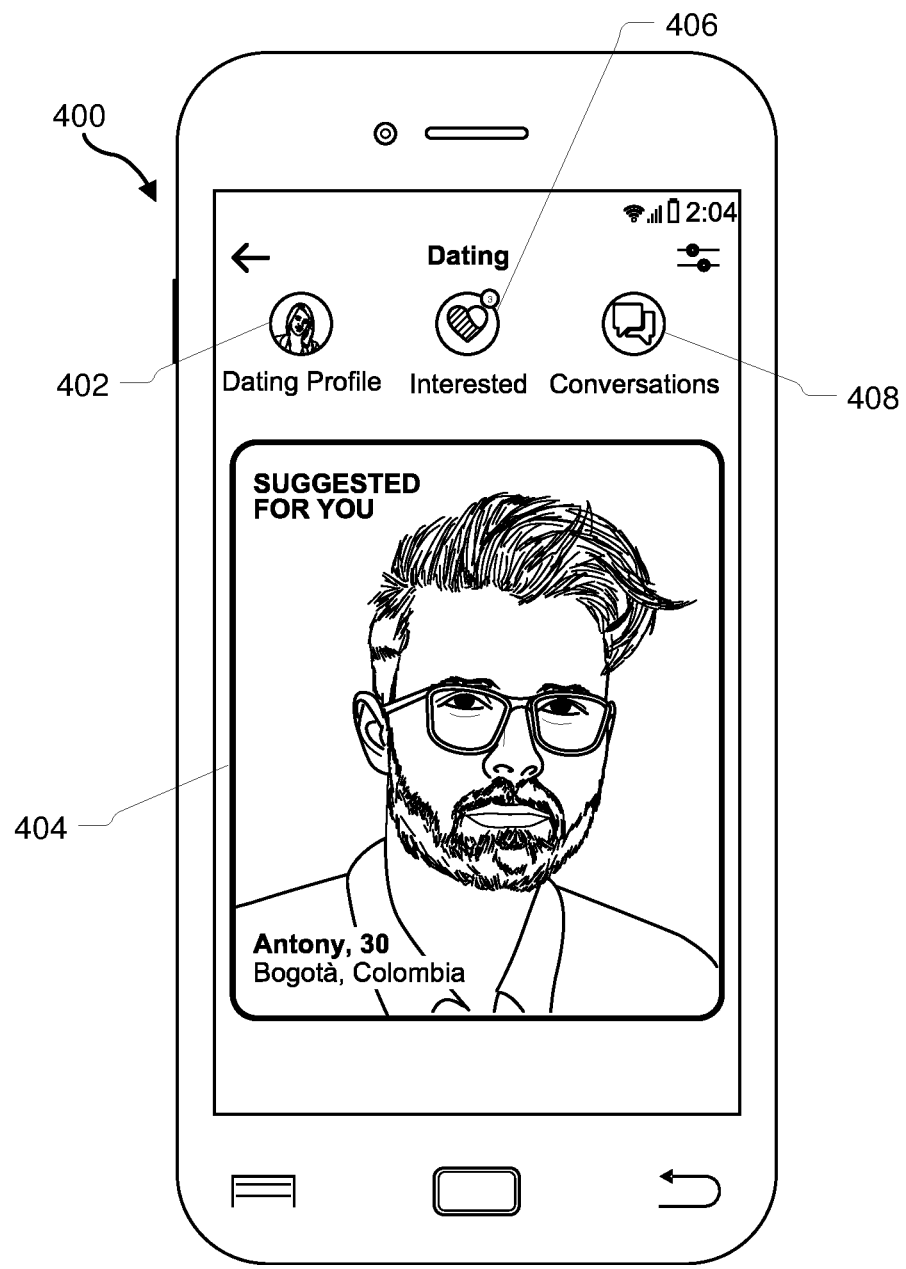
FIGS. 4A-4C, 5-7, 8A-8B, and 9A-9B illustrate various views of an interface of a community-based dating service of a social networking system.
Figure 4C:
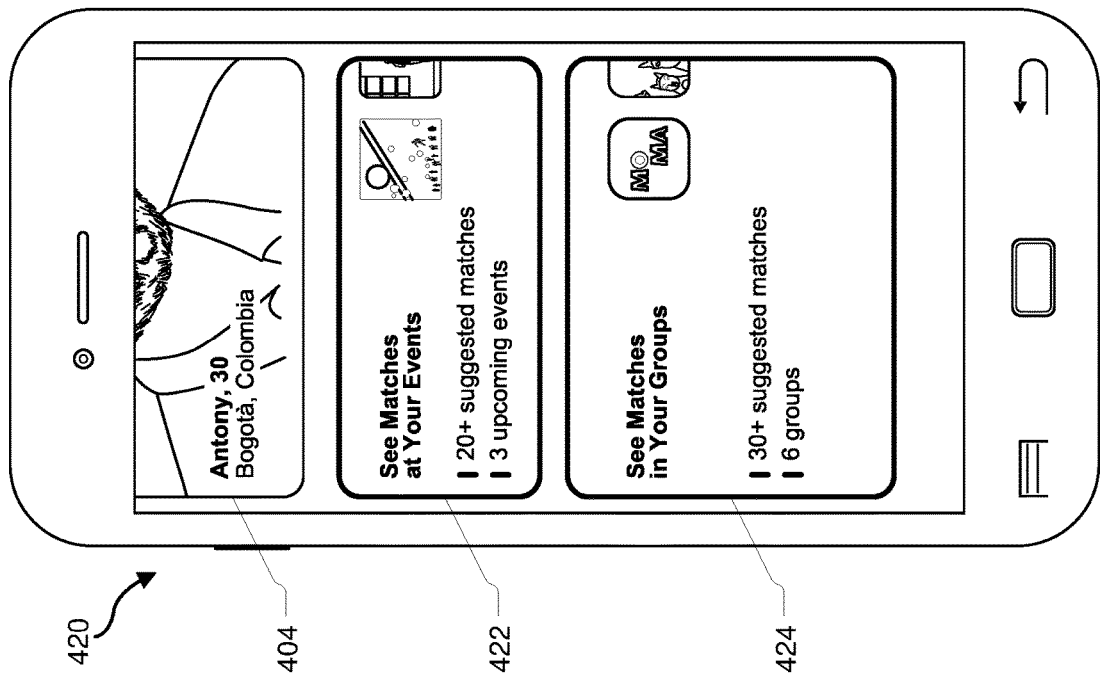
Figure 4B:
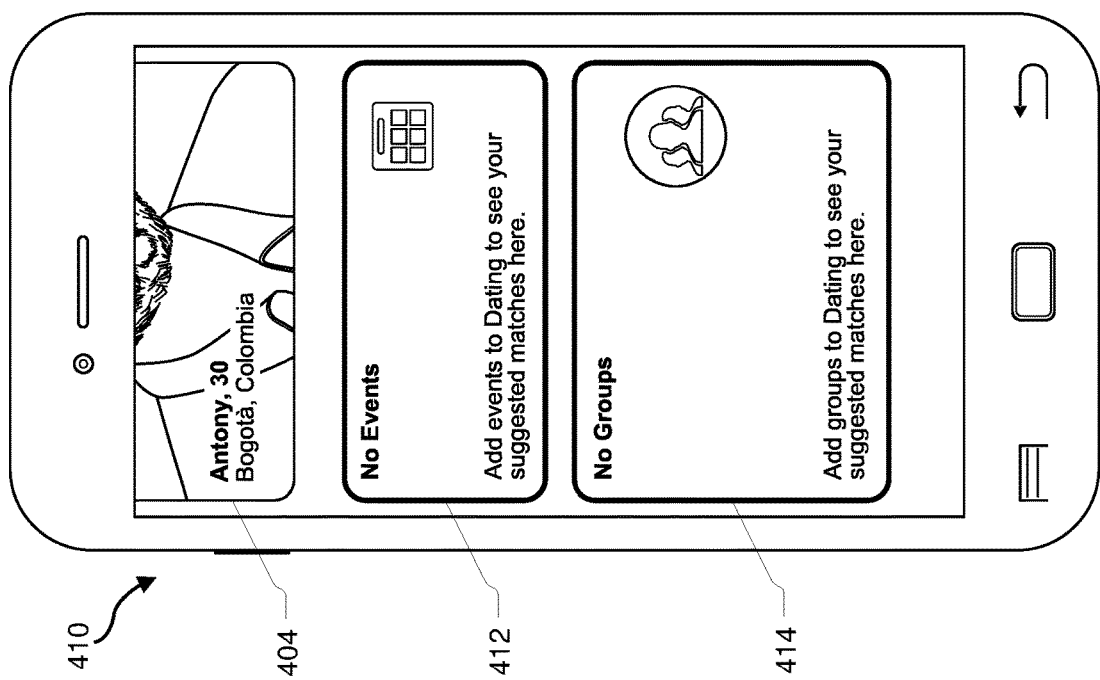

Presenting module 110 may present dating information associated with at least a portion of the set of additional participants within a dating interface (e.g., dating interface 218) in a variety of contexts. By way of illustration, FIGS. 4A-4C illustrate an example of presenting a home screen of a dating service of a social networking system within a dating interface of the social networking system. FIG. 4A includes an interface view 400 that includes various interface elements that may enable a user to interact with a dating service (e.g., dating service 210). For example, one or more of the systems described herein (e.g., one or more of modules 102) may detect a user interaction with dating profile interface element 402, which may cause one or more of the systems described herein to provide a view of a dating profile of the user. As will be described in greater detail below, FIG. 4A also includes an image 404, an interested control 406, and a conversation control 408.

In some examples, a "dating profile" may include any suitable information that a participant in the dating service of the social network (e.g., user 208 and/or one or more of additional participants 216) may wish to share with other participants in the dating service and/or may wish to keep private from users of the social networking system who are not participating in the dating service. For example, a dating profile for user 208 may include, without limitation, an image of user 208, a text description of user 208, a set of interests of user 208, a relationship status of user 208, a geographic location associated with user 208, a set of physical attributes of user 208, and so forth.

Additionally or alternatively, a dating profile an additional participant in the dating service (e.g., an additional participant included in set of additional participants 216) may include, without limitation, an image of the additional participant, a text description of the additional participant, a set of interests of the additional participant, a relationship status of the additional participant, a geographic location associated with the additional participant, a set of physical attributes of the additional participant, and so forth. In some examples, dating profiles of participants in dating service 210 may be included as a part of dating information 222 in participant data 142.

As described above, one or more of the systems described herein (e.g., one or more of modules 102) may present dating information associated with at least a portion of a set of additional participants in the dating service who are also members of at least one interest-based community that also includes user 208 as a member (e.g., additional participant information 220) within a dating interface (e.g., dating interface 218) of a social networking system. For example, as shown in FIG. 4A, image 404 may include dating information associated with an additional member of an interest-based community who is also a participant in a dating service of the social networking system and/or who has also requested and been provided access to the community-based dating feature associated with the interest-based community.

A user may interact with (e.g., tap on, click on, select, etc.) image 404. One or more of modules 102 (e.g., presenting module 110) may cause user device 202 and/or server 206 to receive a selection (e.g., user selection 238) of the additional participant (e.g., a selection of additional member "Antony" indicated by image 404). One or more of modules 102 (e.g., presenting module 110) may cause user device 202 and/or server 206 to present at least one set of information associated with the additional participant in the dating service of the social networking system in response to receiving the selection of the additional participant. In some examples, the set of information may include a dating profile of the additional participant.

As further shown in FIGS. 4B and 4C, presenting module 110 may also present, within dating interface 218, information associated with at least a portion of additional participants 216. By way of illustration, FIG. 4B includes an example interface view 410 that illustrates a dating interface of a social networking system. As shown in FIG. 4B, example interface view 410 may be an additional portion of interface view 400 that may be viewed by scrolling interface view 400 in a suitable direction (e.g., upwards).

In the example shown in interface view 410, user 208 may not yet have elected to add any interest-based communities that he or she may be a member of to dating service 210. In other words, user 208 may not have yet indicated that he or she wishes to view dating information associated with a set of additional participants in the dating service who are also members of one or more interest-based communities (e.g., groups, events, pages, etc.) of which user 208 is a member. Hence, as shown in interface view 410, events interface element 412 indicates that no events have been added to dating service 210 and groups interface element 414 indicates that no groups have been added to dating service 210.

Figure 5:
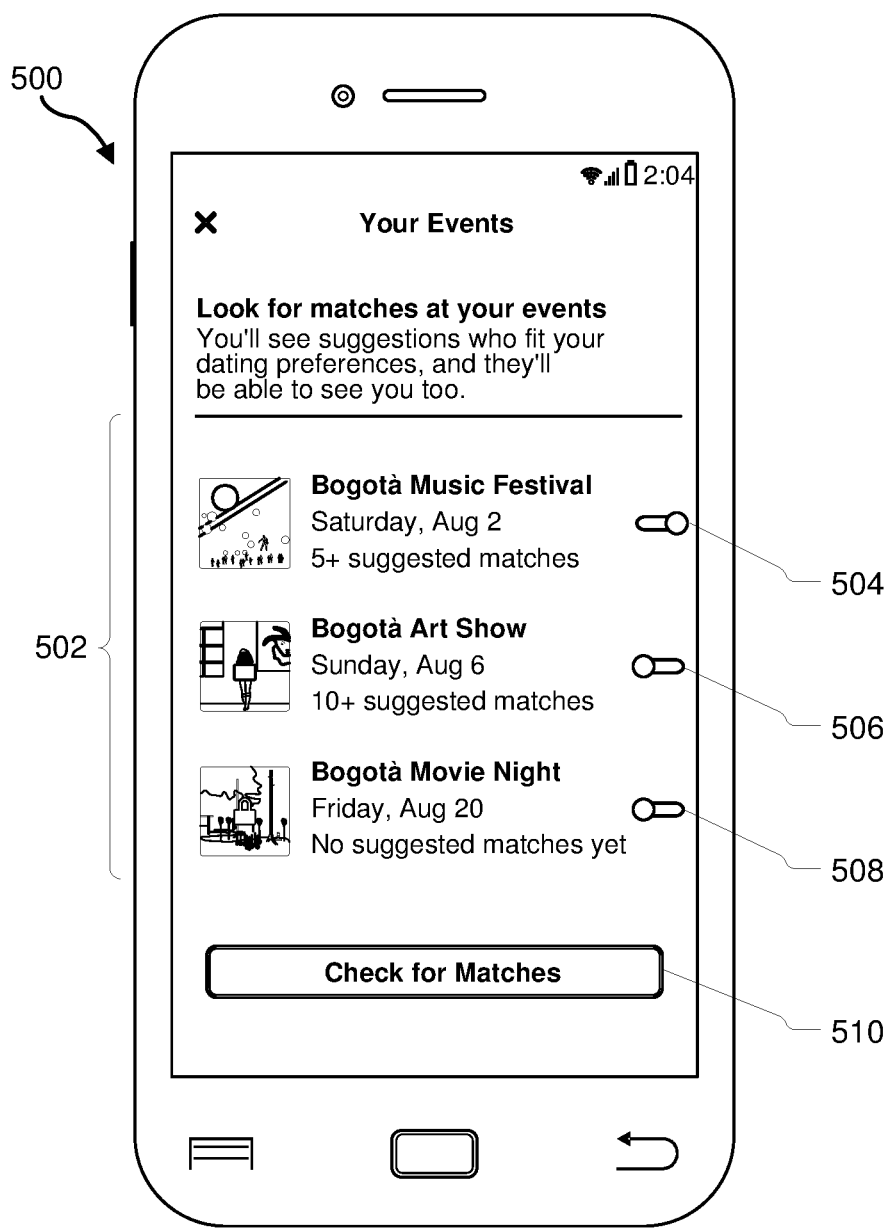

In some examples, presenting module 110 may further present, within dating interface 218, an activation control associated with a representation of an interest-based community included in the set of interest-based communities. Presenting module 110 may then present, via the activation control, a request from the user to include the interest-based community in the set of interest-based communities of the social networking system. For example, FIG. 5 shows an interface view 500 that includes a set of representations of interest-based communities 502 ("set of representations 502"). Included in set of representations 502 are a representation of a "Bogota Music Festival" event, a representation of a "Bogota Art Show" event, and a representation of a "Bogota Movie Night" event. Each of the events represented in set of representations 502 may (1) include user 208 as a member (e.g., user 208 may have indicated an interest in the event) and (2) may have an activated (e.g., an administrator-activated) community-based dating feature.

As also shown in FIG. 5, interface view 500 may also include, associated with each representation of an interest-based community included in set of representations 502, an activation control. In this example, the activation controls may be slider switch 504 associated with the "Bogota Music Festival" event, slider switch 506 associated with the "Bogota Art Show" event, and slider switch 508 associated with the "Bogota Movie Night" event. A user (e.g., user 208) may interact with a slider switch associated with a representation of an interest-based community to indicate a request to include that interest-based community in the set of interest-based communities that may be identified by identifying module 106 and/or from which selecting module 108 may select additional participants 216.

For example, as shown in FIG. 5, user 208 may have interacted with slider switch 504, slider switch 506, and slider switch 508 to indicate a request to include the "Bogota Music Festival" event and exclude the "Bogota Art Show" and "Bogota Movie Night" events, respectively. The user may then select button 510 to cause presenting module 110 to receive the request (e.g., request 228).

Returning to FIG. 4C, FIG. 4C includes another example interface view 420 that illustrates an alternative view of the dating interface of the social networking system. As shown in FIG. 4C, example interface view 420 may be an additional portion of interface view 400 that may be viewed by scrolling interface view 400 in a suitable direction (e.g., upwards).

In the example shown in interface view 420, user 208 may have elected to add a number of interest-based communities that he or she may be a member of to dating service 210. In other words, user 208 may have indicated that he or she wished to view dating information associated with a set of additional participants in the dating service who are also members of one or more interest-based communities (e.g., groups, events, pages, etc.) of which user 208 is a member. Hence, as shown in interface view 420, events interface element 422 indicates that three upcoming events have been added to dating service 210 and that there are "20+" suggested matches for user 208 in those upcoming events. Similarly, groups interface element 424 indicates that six groups have been added to dating service 210, and that there are "30+" suggested matches for user 208 in those six groups. Hence, in this example, presenting module 110 may present dating information associated with at least a portion of additional participants 216 by indicating a number of additional participants 216 within dating interface 218 belong to events, groups, pages, etc. that also include user 208 as a member and that user 208 has elected to activate for dating service 210.

In some embodiments, presenting module 110 may present dating information associated with the portion of the set of additional participants within the dating interface of the social networking system by presenting, within the dating interface of the social networking system, a representation of the set of interest-based communities (e.g., IBC 226). Presenting module 110 may then receive a user selection of an interest-based community included in the set of interest-based communities and may determine that an additional participant included in the set of additional participants is a member of the interest-based community. Presenting module 110 may then present an element of a dating profile associated with the additional participant within the dating interface.

Figure 6:
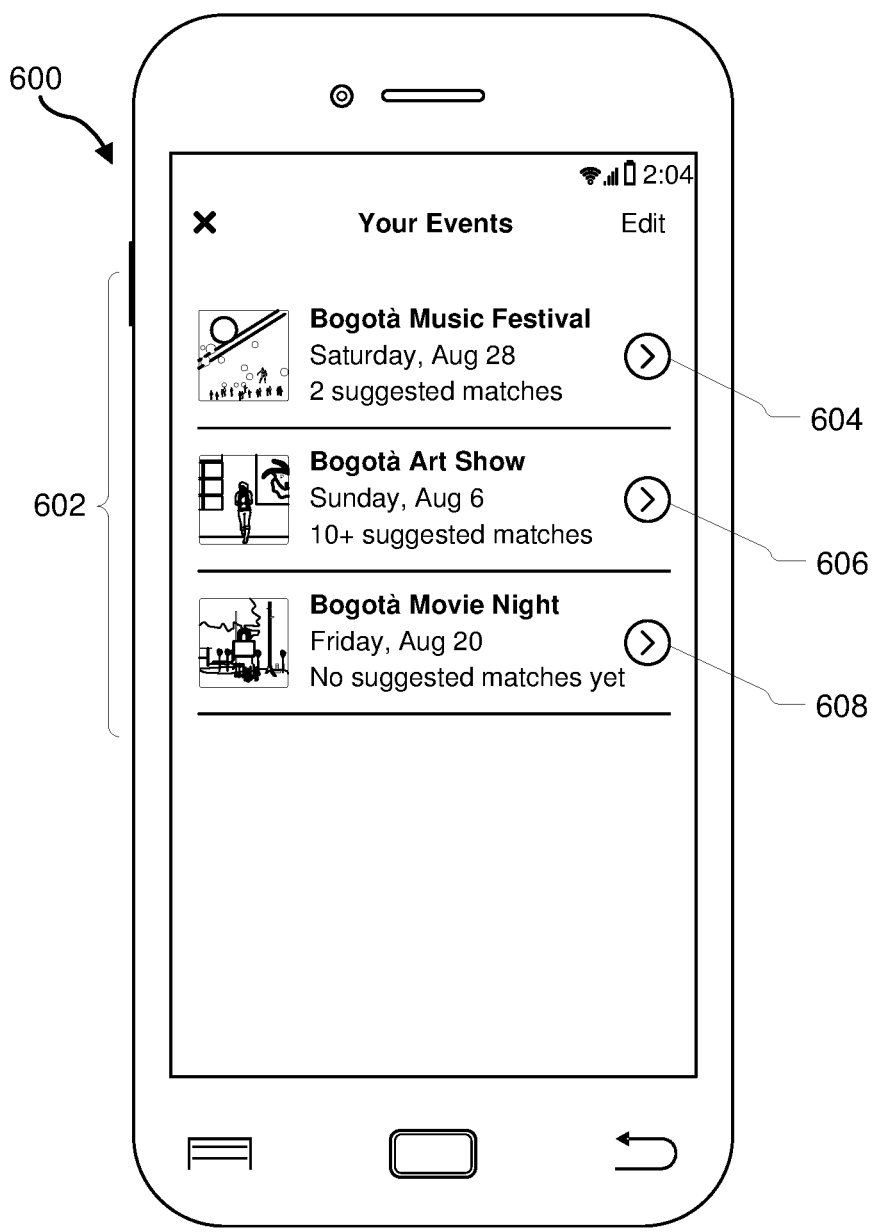

By way of illustration, FIG. 6 shows an interface view 600 of a dating interface that includes an accordion container user interface element 602 (e.g., "accordion container 602"). As shown, accordion container 602 includes a set of accordion label entries that each (1) correspond to a different interest-based community included in the set of interest-based communities, and (2) is associated with an expansion control. For example, accordion label entry 604 corresponds to the "Bogota Music Festival" event, accordion label entry 606 corresponds to the "Bogota Art Show" event, and accordion label entry 608 corresponds to the "Bogota Movie Night" event. In this example, user 208 may have chosen to include all of these events within the dating service.

When a user selects an expansion control associated with one of the events shown in FIG. 6, presenting module 110 may receive a user selection of the corresponding interest-based community and may determine that an additional participant included in the set of additional participants is a member of the corresponding interest-based community. Presenting module 110 may then present an element of a dating profile associated with the additional participant within the dating interface by presenting the element of the dating profile within an accordion content element associated with the accordion label entry.

Figure 7:
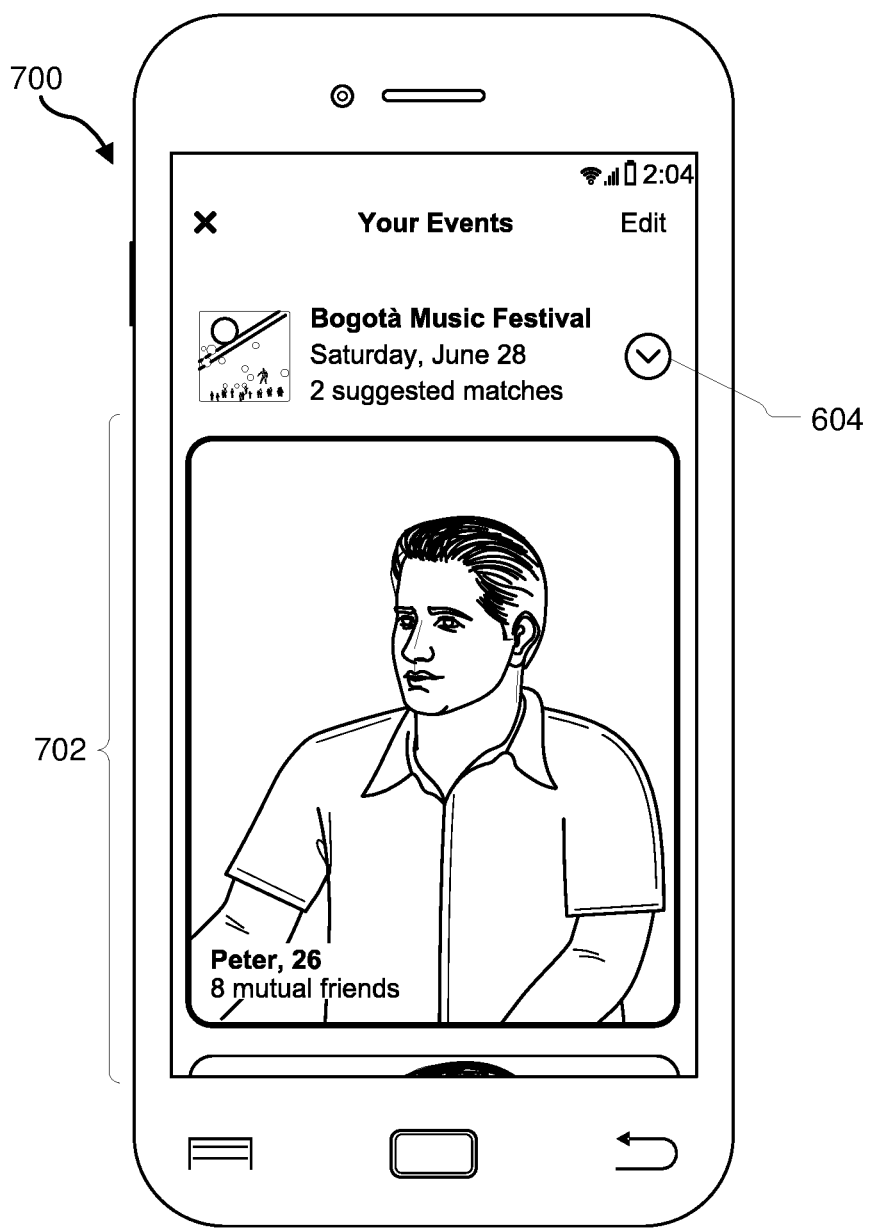

Turning to FIG. 7, FIG. 7 shows an interface view 700 that may be a view of a dating interface after user 208 selects an expansion control associated with accordion label entry 604. As shown, interface view 700 may include a list of potential matches 702. List of potential matches 702, presented within an accordion content element associated with accordion label entry 604, may include dating profile information (e.g., an image, a name, a geographic location, etc.) associated with additional participants in the dating service that are also members of the "Bogota Music Festival" event. In some embodiments, as described herein, one or more of modules 102 (e.g., selecting module 108, presenting module 110, etc.) may select the list of potential matches 702 based on one or more additional criteria, such as a level of compatibility with user 208 within the dating service, one or more desired user attributes, etc.

Figure 8B:
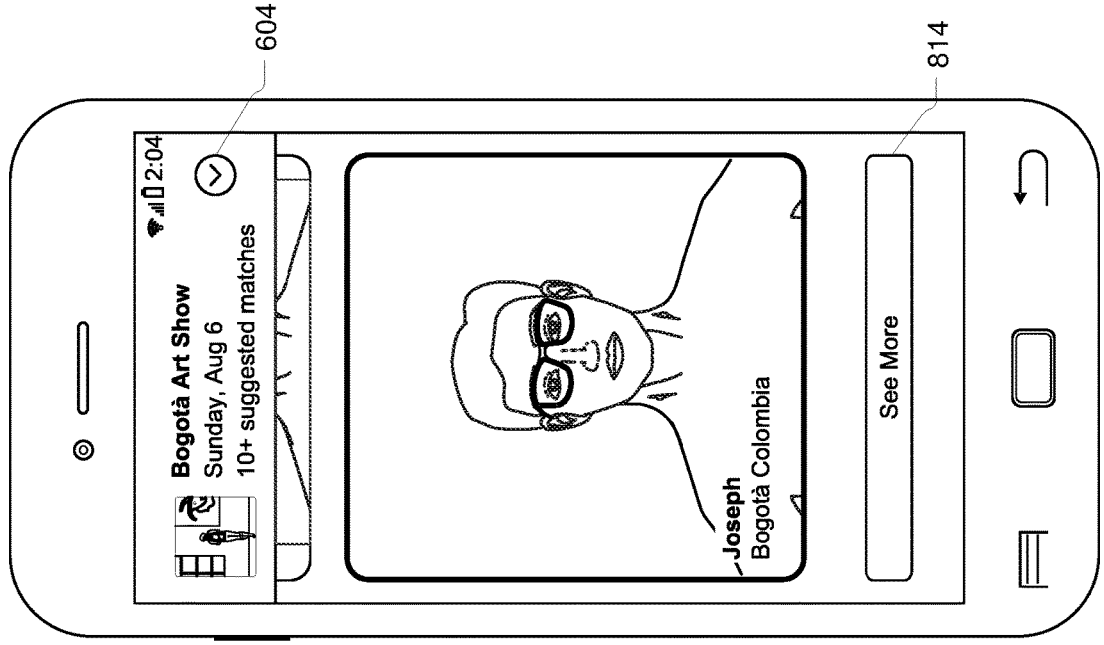
Figure 8A:
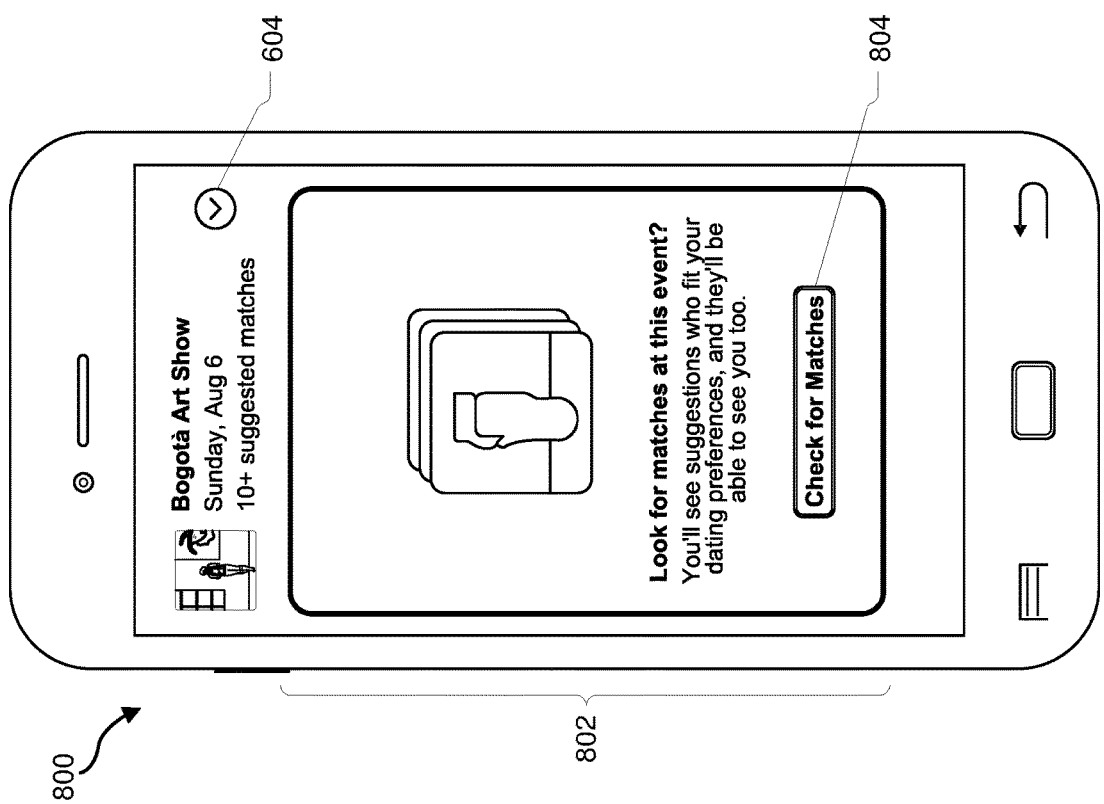

Turning to FIG. 8A, FIG. 8A shows an interface view 800 that may be a view of a dating interface after user 208 selects an expansion control associated with accordion label entry 606. In this example, user 208 may be a member of the "Bogota Art Show" event but may not have elected to include additional participants in the dating service who are also members of the "Bogota Art Show" event as matches within the dating interface. As shown, interface view 800 includes a user query 802 that asks the user whether he or she wants potential matches who may be members of the "Bogota Art Show" event to be included as matches within the dating interface. The user may select activation control 804 to cause presenting module 110 to receive a request from the user to include the "Bogota Art Show" event within the set of interest-based communities. Based on the receiving of the request, selecting module 108 may include members of the "Bogota Art Show" event in the set of additional participants in the dating service (e.g., a set of potential matches for the user).

FIG. 8B shows an interface view 810 that may include a list of potential matches 812 that may be presented within an accordion content element associated with accordion label entry 604 after a user (e.g., user 208) has selected activation control 804. Like list of potential matches 702, list of potential matches 812 may include dating profile information (e.g., an image, a name, a geographic location, etc.) associated with additional participants in the dating service that are also members of the "Bogota Art Show" event. In some embodiments, as described herein, one or more of modules 102 (e.g., selecting module 108, presenting module 110, etc.) may select the list of potential matches 812 based on one or more additional criteria, such as a level of compatibility with user 208 within the dating service, one or more desired user attributes, etc.

Additionally, in some embodiments, list of potential matches 812 may only show dating information associated with a portion of the set of additional participants. As shown in FIG. 8B, a user may select button 814. This selection may cause presenting module 110 to receive an instruction to present dating information associated with an additional portion of the set of additional participants (e.g., one or more additional matches for user 208 who are members of the "Bogota Art Show" event) within an accordion content element associated with accordion label entry 606.

Figure 9B:
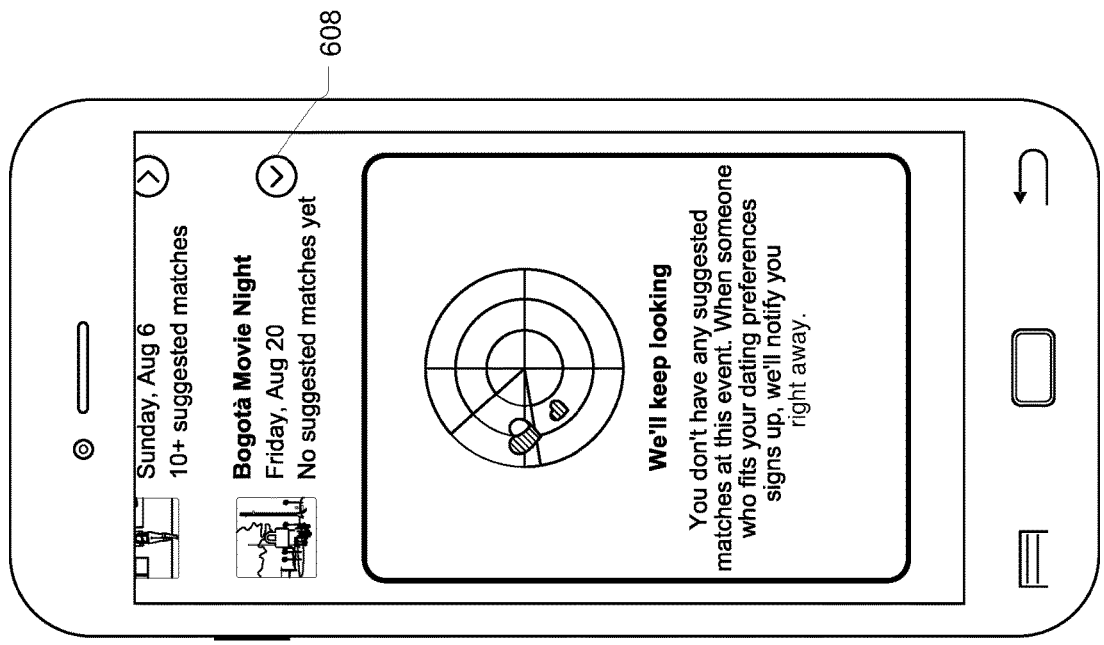
Figure 9A:
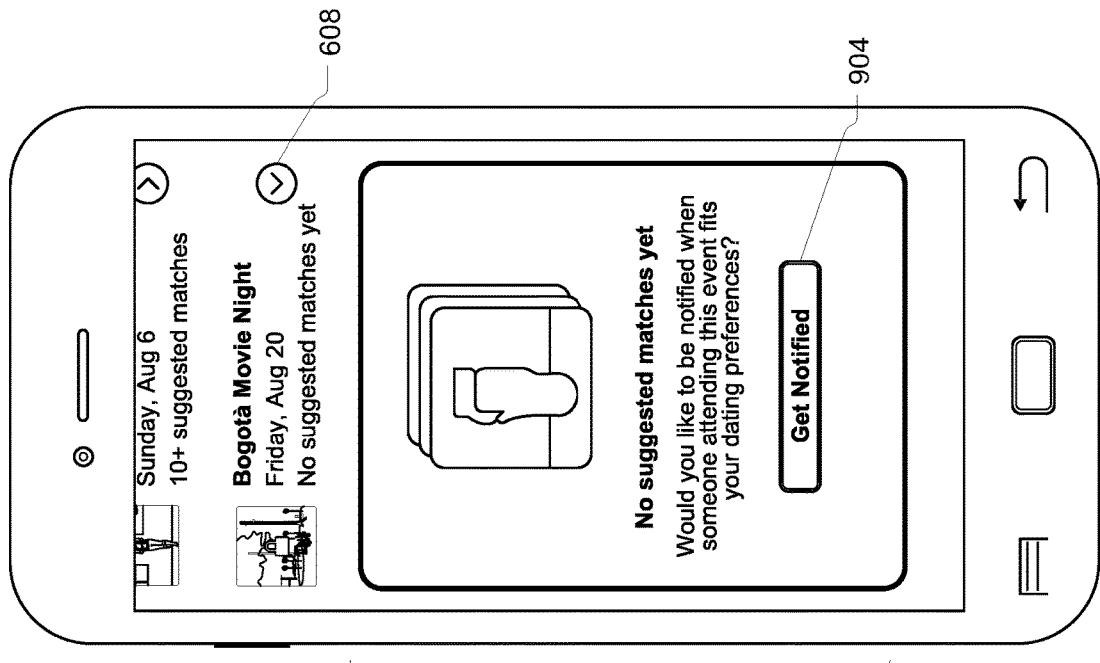

Continuing to FIG. 9A, FIG. 9A shows an interface view 900 that may be a view of a dating interface after user 208 selects an expansion control associated with accordion label entry 608. In this example, user 208 may be a member of the "Bogota Movie Night" event interest-based community, and user 208 may have indicated a desire to include the "Bogota Movie Night" event in the set of interest-based communities from which selecting module 108 may select additional participants (e.g., additional participants 216). However, there may be no additional participants in the dating service who are also members of the "Bogota Movie Night" event, or none of the additional participants meet one or more additional criteria for matches for user 208. As a result, presenting module 110 may present notification query 902 within an accordion content element associated with 606. As shown, notification query 902 may include a message that notifies a user (e.g., user 208) that there are no suggested matches for the user in the "Bogota Movie Night" event.

Notification query 902 may also include a notification control 904. A user (e.g., user 208) may select notification control 904. In response to user 208 selecting notification control 904, one or more of modules 102 (e.g., presenting module 110) may receive a user selection (e.g., as user selection 238). In response to receiving the user selection, one or more of modules 102 (e.g., selecting module 108, presenting module 110, etc.) may, upon identifying and/or selecting an additional participant who is a member of the "Bogota Movie Night" event and who optionally meets any additional criteria for matches for user 208, may notify user 208 of the additional participant (e.g., via a notification system of the social networking system).

FIG. 9B includes a user interface view 910 that may include an informational message 912 that one or more modules 102 (e.g., selecting module 108, presenting module 110, etc.) may present within an accordion content element associated with 606 subsequent to receiving a request via notification control 904 and identifying and/or selecting any additional matches for user 208 within the "Bogota Movie Night" event. Informational message 912 may indicate to user 208 that there are no suggested matches for the user within the "Bogota Movie Night" event, but that the dating service will notify user 208 when a participant in the dating service who meets dating preferences of user 208 becomes a member of the "Bogota Movie Night" event.

A user may interact with (e.g., tap on, click on, select, etc.) with dating information associated with one or more additional participants in the dating service, such as image 404, one or more images included in list of potential matches 702, one or more images included in list of potential matches 812. One or more of modules 102 (e.g., selecting module 108, presenting module 110, etc.) may cause user device 202 and/or server 206 to receive a selection (e.g., as user selection 238) of the additional member (e.g., a selection of additional member "Antony" indicated by image 404). One or more of modules 102 (e.g., presenting module 110, etc.) may cause user device 202 and/or server 206 to present at least one set of information associated with the additional member of the interest-based community to the user in response to receiving the selection of the additional member of the interest-based community. In some examples, the set of information may include a dating profile of the additional member of the interest-based community.

Figure 10B:
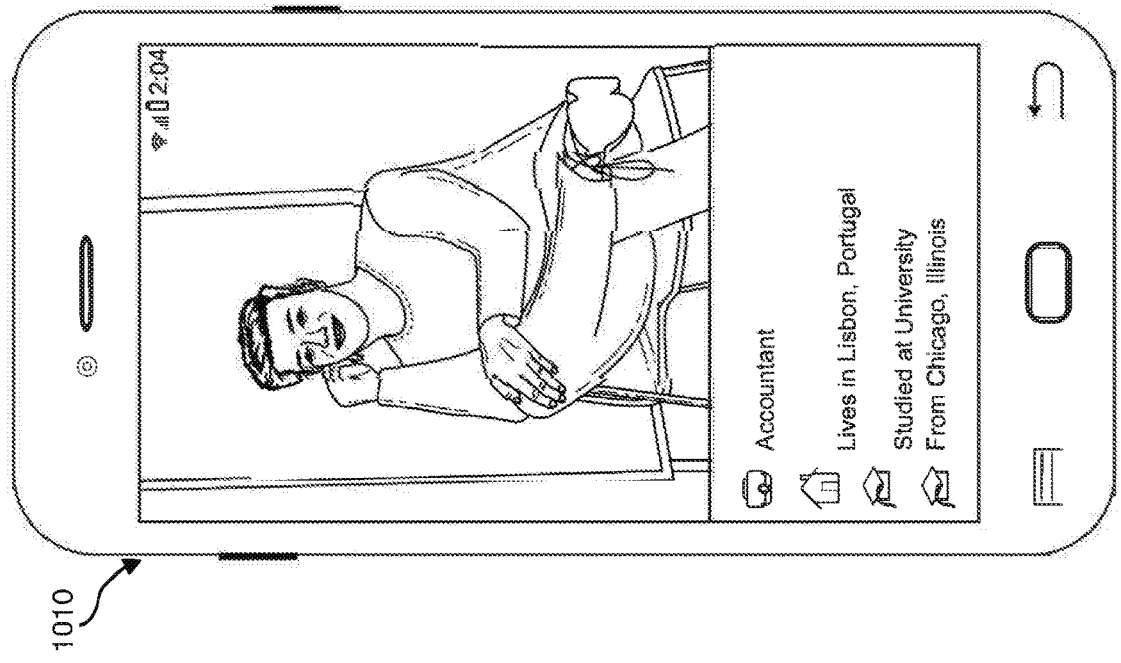
FIGS. 10A-10C, 11-12, and 13A-13B include interface views that illustrate examples of presenting, within a dating interface, a conversation interface that may enable a user to start a conversation with an additional member of the interest-based community in accordance with some embodiments described herein.
Figure 10A:
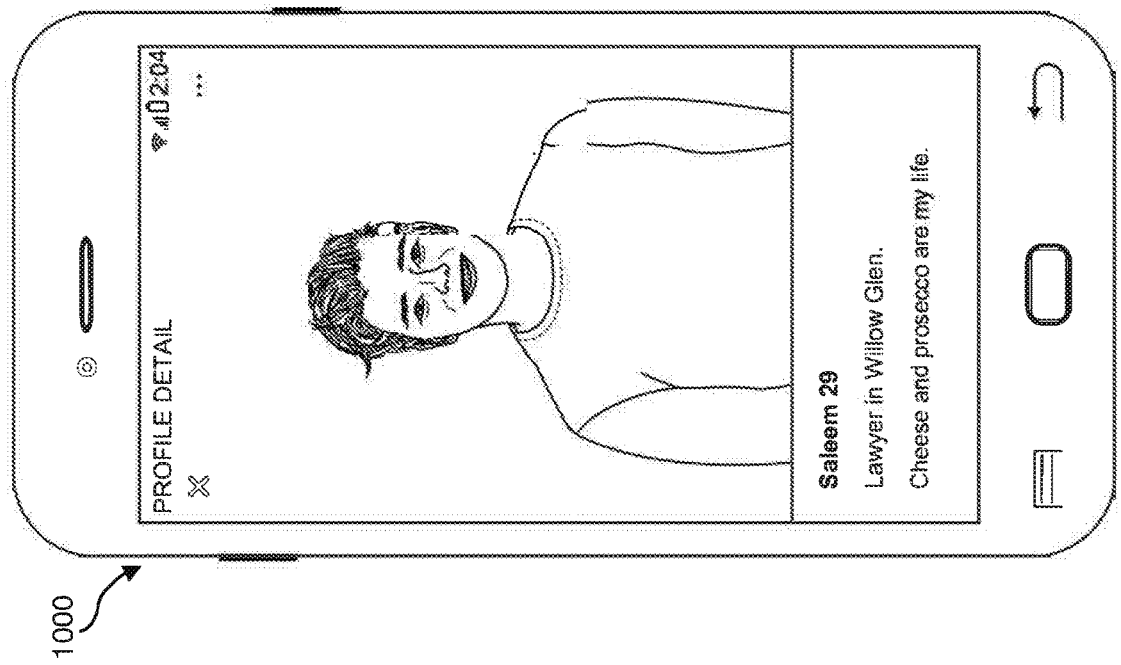
Figure 10C:
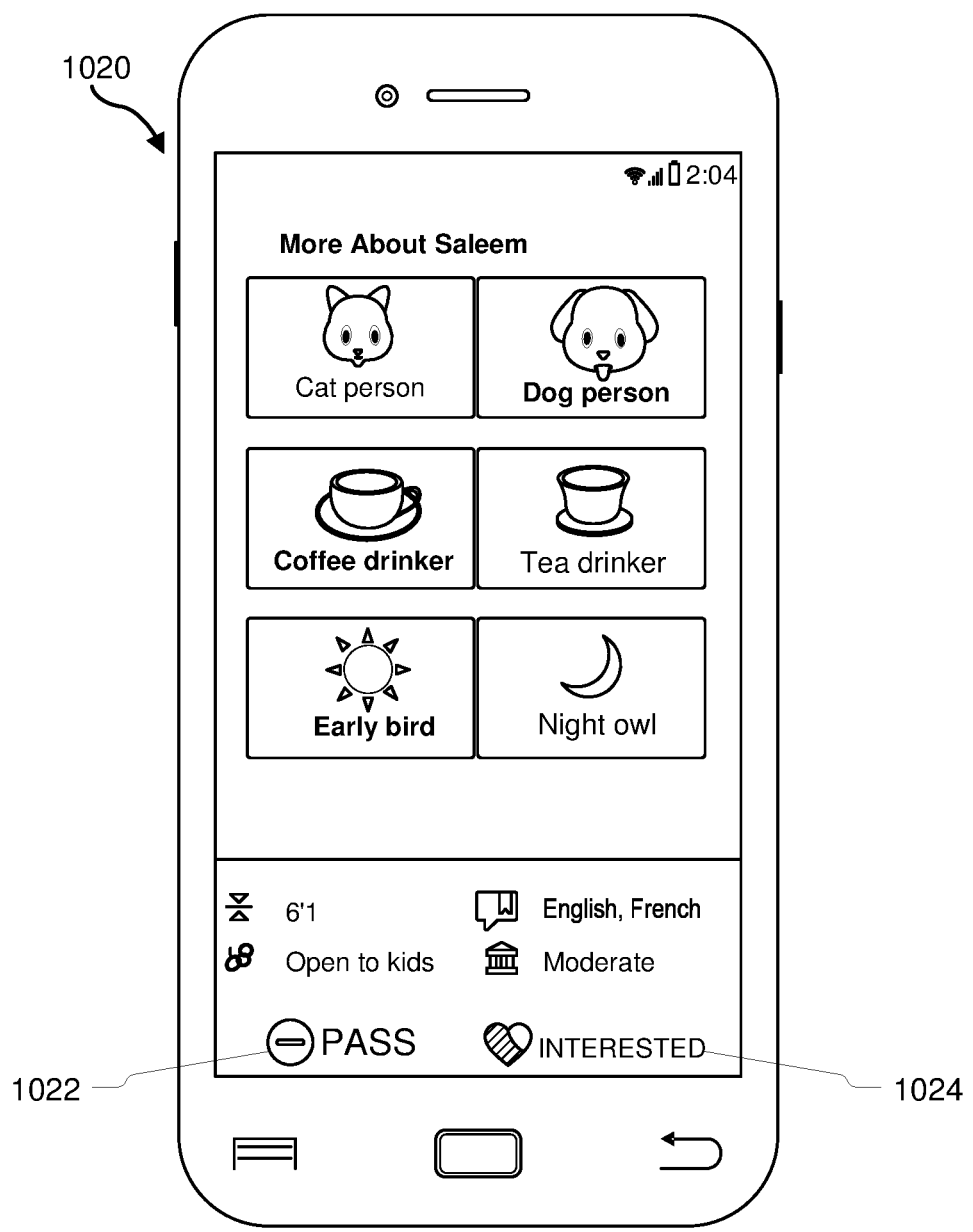

FIGS. 10A-10C include interface views that illustrate examples of presenting, within a dating interface of a social networking system, dating information associated with a participant in a dating service of a social networking system who is also a member of an interest-based community. As shown in these figures, a user (e.g., user 208) may have selected (e.g., tapped on an image presented within a dating interface of) an additional member named Saleem. Interface view 1000 shown in FIG. 10A, interface view 1010 shown in FIG. 10B, and interface view 1020 shown in FIG. 10C illustrate examples of information associated with the dating service (e.g., dating service 210) and additional member Saleem that one or more of the systems described herein (e.g., one or more of modules 102) may present to the user in response to receiving the user's selection of additional member Saleem, such as portions of Saleem's dating profile.

FIG. 10C further includes a declination control 1022 and an interest control 1024. A user viewing the dating profile shown in FIGS. 10A-10C may select one of these controls to indicate whether they are interested in the participant shown in the dating profile. For example, if the user is not interested in making a dating connection with Saleem, the user may select declination control 1022, which may cause one or more of the systems described herein to no longer present Saleem and/or Saleem's dating profile to the user and/or to add Saleem to a set of declined participants associated with the user. Conversely, if the user is interested in making a dating connection with Saleem, the user may select interest control 1024, which may cause one or more of the systems described herein to present a conversation starter interface to the user.

Figure 11:
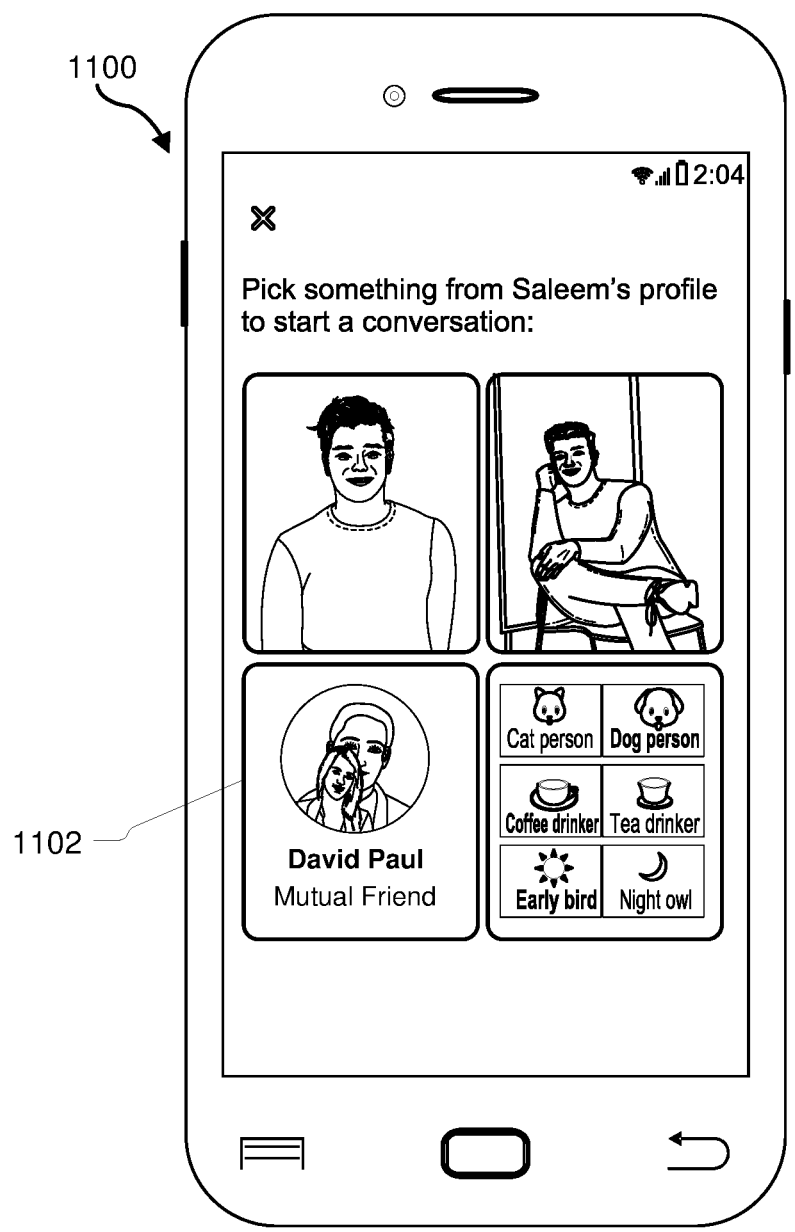
Figure 12:
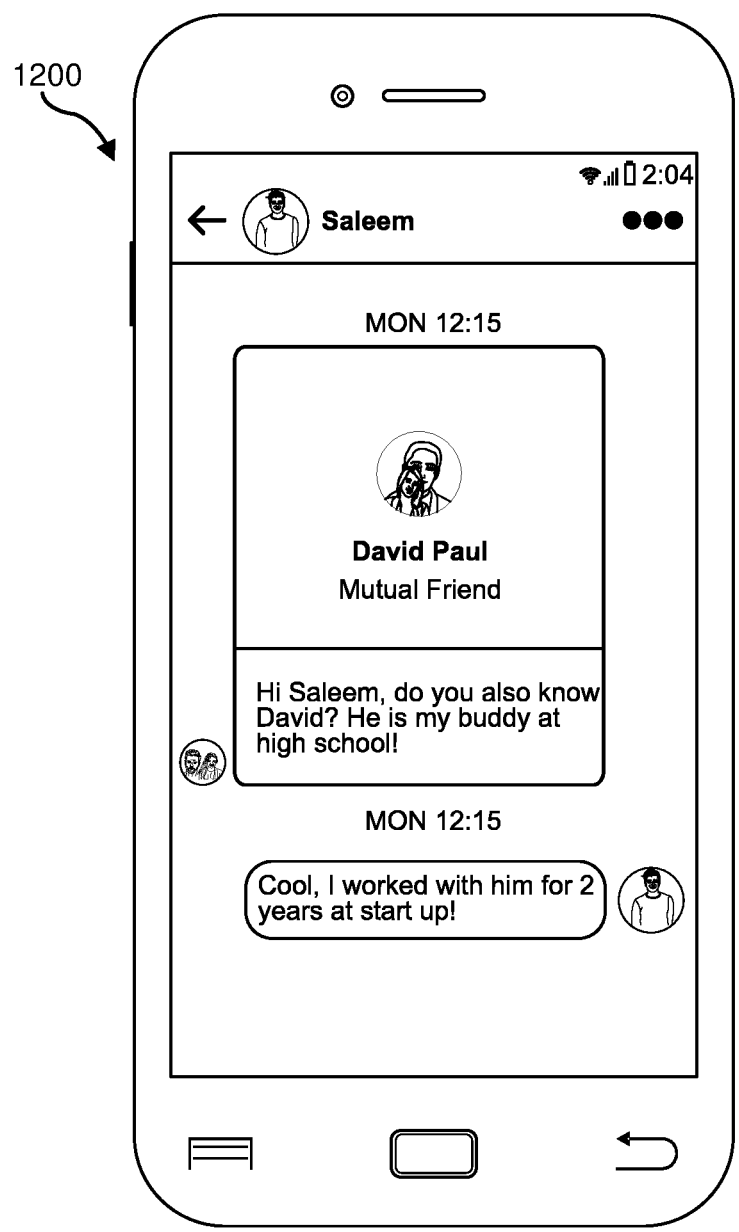

FIGS. 11-12 include interface views that illustrate examples of presenting, within a dating interface, a conversation starter interface that may enable a user to start a conversation with an additional member of the interest-based community. FIG. 11 includes interface view 1100 that may enable a user to select one or more conversation starter elements. In some examples, a conversation starter element may include any data associated with a participant in a social networking system that may be selected by other users of the social networking system to initiate a conversation with the user within a conversation starter interface. Conversation starter elements may include, without limitation, images, text, a set of interests, geographic locations, and so forth. In some examples, conversation starter elements may be included in and/or selected from a dating profile of a user. A user may select one or more conversation starter elements and may write a conversation starter message to the additional member.

In some examples, a conversation starter element may include and/or represent one or more mutual friends of the user (e.g., user 208) and the additional participant. For example, one or more of modules 102 may identify at least one mutual friend of the user and the additional participant within the social networking system. One or more of modules 102 may then generate a conversation starter element representative of the mutual friend and may include the conversation starter element as part of the dating profile of the additional participant and/or present the conversation starter element within the dating interface. As an example, interface view 1100 includes a mutual friend conversation starter element 1102 that may indicate that both the user and Saleem share user David Paul as a mutual friend.

FIG. 12 includes an interface view 1200 that shows a user entering a message to an additional member regarding mutual friend conversation starter element 1102. In some examples, one or more of the systems described herein (e.g., one or more of modules 102) may prevent inclusion of a restricted audiovisual element, such as an image, an audio file, a harassing text message, etc., within the conversation starter message. Hence, in some examples, the conversation starter message may be limited to text and/or the conversation starter element. This may prevent users from engaging in harassing behavior.

One or more of the systems described herein (e.g., one or more of modules 102) may receive the selection and the message, and may send the conversation starter message, that may include the selected conversation starter element, to the additional member of the interest-based community. In some embodiments, one or more of the systems described herein may determine whether the additional member has sent a response to the conversation starter message to the user. If the additional member has sent a response, the response may be provided to the user within the dating interface (e.g., within a messaging interface of the dating interface). If the additional member has not sent a response, one or more of the systems described herein (e.g., one or more of modules 102) may prevent the user from sending an additional message to the additional member. This may further prevent users from engaging in harassing behavior.

A specialized messaging interface for a dating service may enable participants in the dating service to carry on conversations with each other separately from other messaging interfaces that may be provided by the social networking system. FIG. 13A may include an interface view 1300 that illustrate a messaging interface of a dating service of a social networking system in accordance with some embodiments described herein. A user may be presented with interface view 1300 upon selecting conversation control 408 shown in FIG. 4. Interface view 1300 includes several ongoing conversations the user may be engaged in with other participants in the dating service. As an example, interface view 1300 shows conversation 1302, which represents a conversation that the user is conducting with another participant named Roy.

Figure 13B:
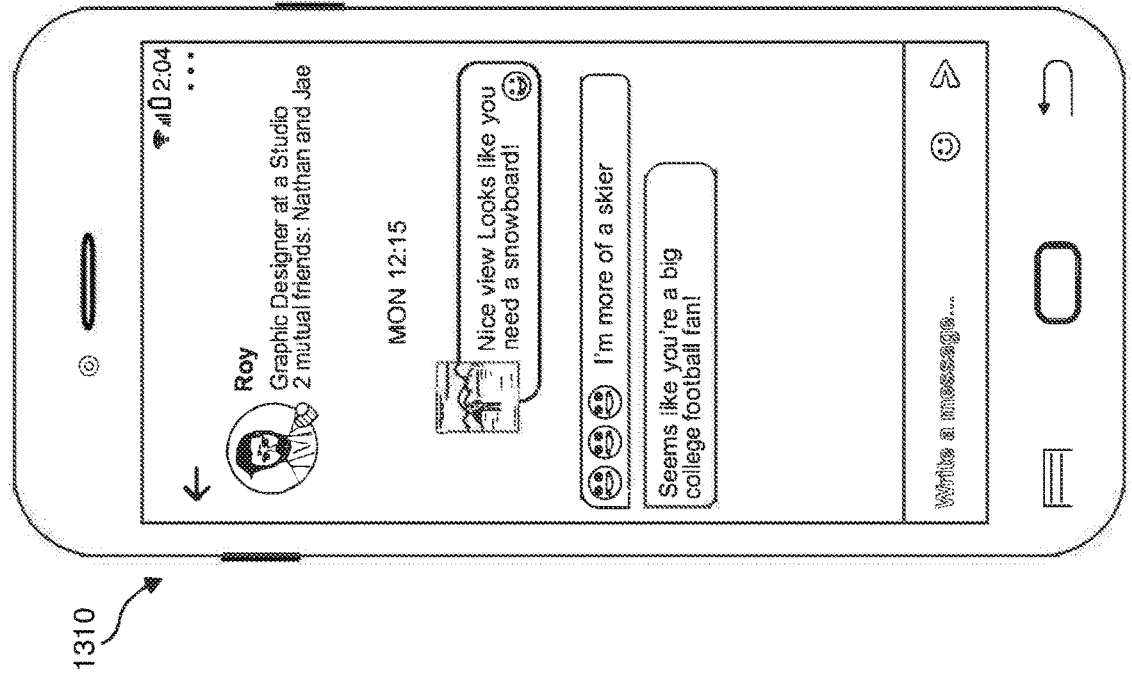
Figure 13A:
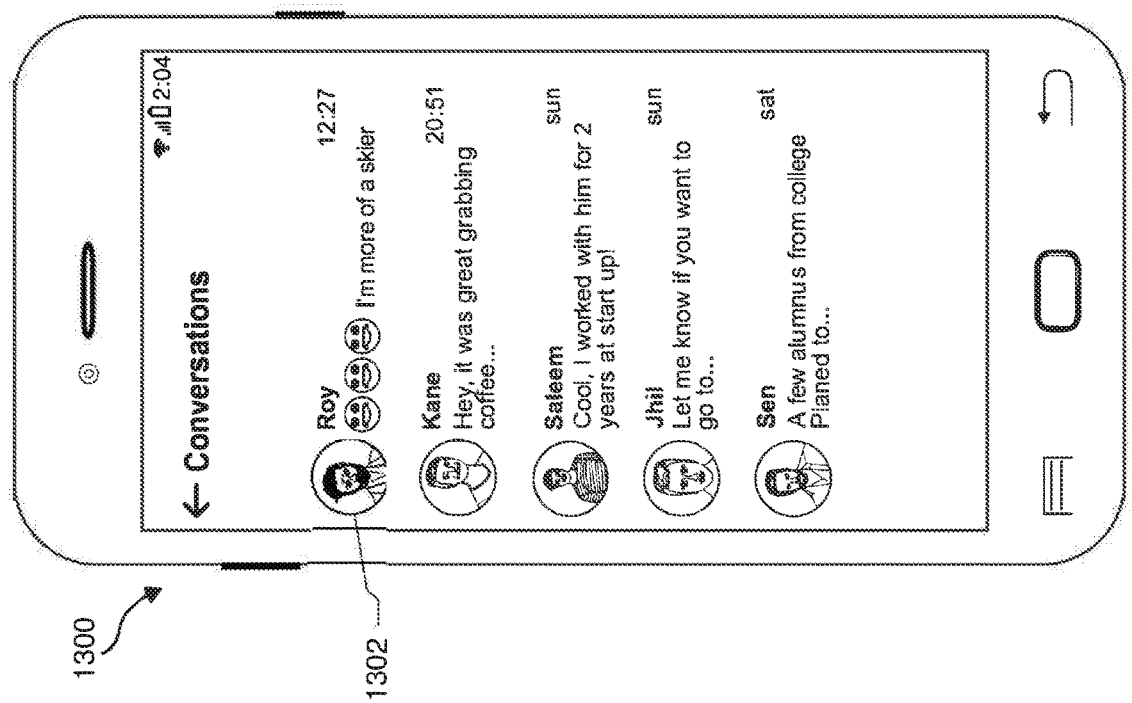

FIG. 13B includes interface view 1310, which may illustrate a messaging interface that shows an ongoing conversation between the user and the additional participant Roy. A user may be presented with interface view 1310 upon choosing to respond to a conversation starter message. Additionally or alternatively, a user may be presented with interface view 1310 upon selecting conversation 1302.

Figure 15:
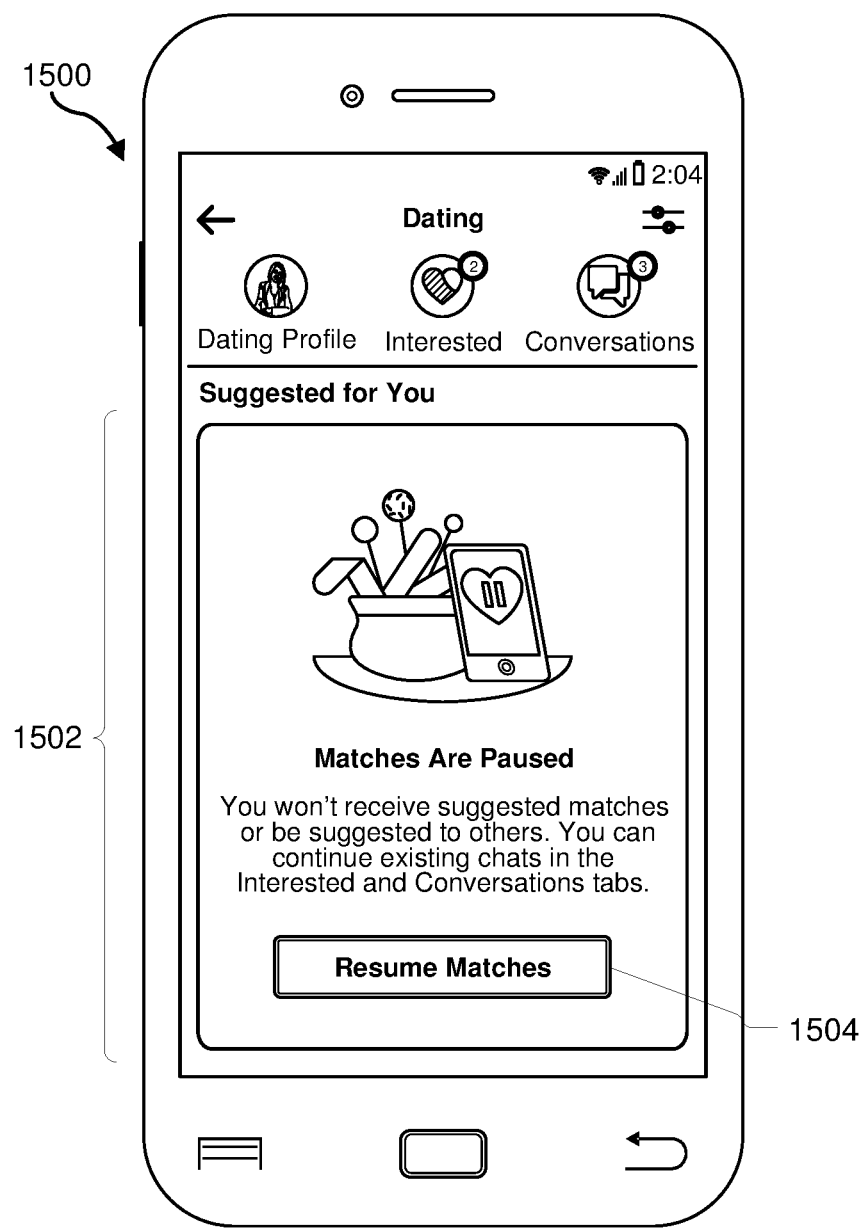

In some embodiments, a user may wish to cause the dating service to refrain from presenting the user with additional matches. For example, the user may have started a relationship with another person and no longer wishes to be presented with additional potential matches. FIG. 14A, FIG. 14B, and FIG. 15 provide an overview of an example approach to pausing the discovery of additional matches within a dating service. As illustrated therein, one or more systems may present the user with a match pause control that, when selected by the user, may cause the dating service to refrain from presenting additional matches to the user. In some embodiments, the match pause control may be presented within the dating interface. In additional or alternative embodiments, the match pause control may be included in an application management and/or "settings" interface.

For example, one or more of modules 102 (e.g., presenting module 110) may present a match pause control within a dating interface (e.g., dating interface 218) and/or an application management interface. One or more of modules 102 may also receive, via the match pause control, a match pause request (e.g., as user selection 238) via the match pause control. One or more of modules 102 may further exclude dating information associated with a part of the set of additional participants from the dating interface in response to receiving the match pause request.

FIG. 14A shows a view 1400 of an application management interface that may include various management and/or configuration options for a dating service, a dating interface, and/or a social networking application that may provide an interface for a dating service of a social networking system. As shown, the application management interface includes a match pause control 1402. FIG. 14B may show an additional view 1410 of the application management interface that may include a confirmation message that may include a confirmation control 1412. One or more of modules 102 (e.g., presenting module 110) may present additional view 1410 in response to receiving a user selection of match pause control 1402. A user may select confirmation control 1412 to confirm a desire to pause discovery of additional matches within the dating service.

One or more of modules 102 (e.g., presenting module 110) may receive a match pause request (e.g., as user selection 238) via match pause control 1402 and/or confirmation control 1412. In response, one or more of modules 102 (e.g., selecting module 108, presenting module 110, etc.) may exclude dating information associated with a part of the set of additional participants (e.g., a part of additional participants 216) from the dating interface in response to receiving the match pause request.

In some examples, refraining from presenting the user with additional matches may include refraining from presenting the user with additional matches for a period of time. In at least one example, the period of time may be a predefined period of time (e.g., 1 day, 1 week, 1 month, etc.). In additional examples, the match pause control may include a duration control that may enable the user to select the time. In some examples, even though the dating service may refrain from presenting the user with additional matches, the system may continue to facilitate communication by the user with one or more previous matches, such as via a conversations interface and/or a messaging interface of the dating service.

Additionally, at least one example system may provide the user with a match resume control that, when selected by the user, may cause the example system to resume presenting the user with matches. As with the match pause control, the match resume control may be included in the dating interface and/or an application management and/or "settings" interface.

As an example, FIG. 15 shows an interface view 1500 of a dating interface that may include an informational message 1502 that may inform the user that matches are paused, and hence that no additional matches will be presented to the user at this time. Furthermore, interface view 1500 also includes a match resume control 1504 that a user may select to cause the dating service (e.g., one or more of modules 102) to resume presenting new potential matches to the user.

Figure 16B:
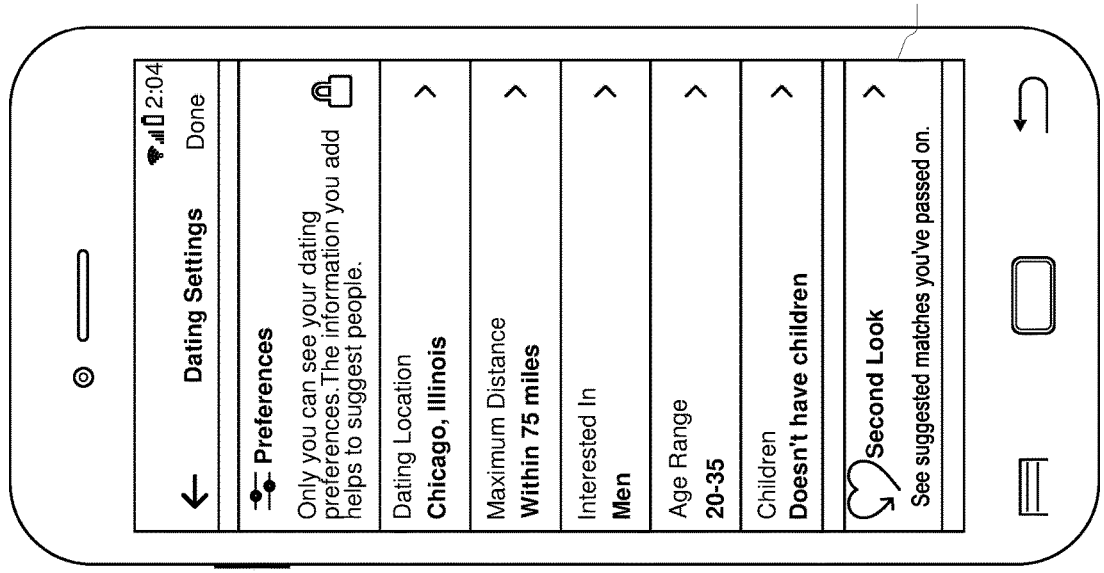
FIGS. 16A-16C and 17A-17B illustrate various views of a second-look interface of a community-based dating service of a social networking system in accordance with some embodiments described herein.
Figure 16A:
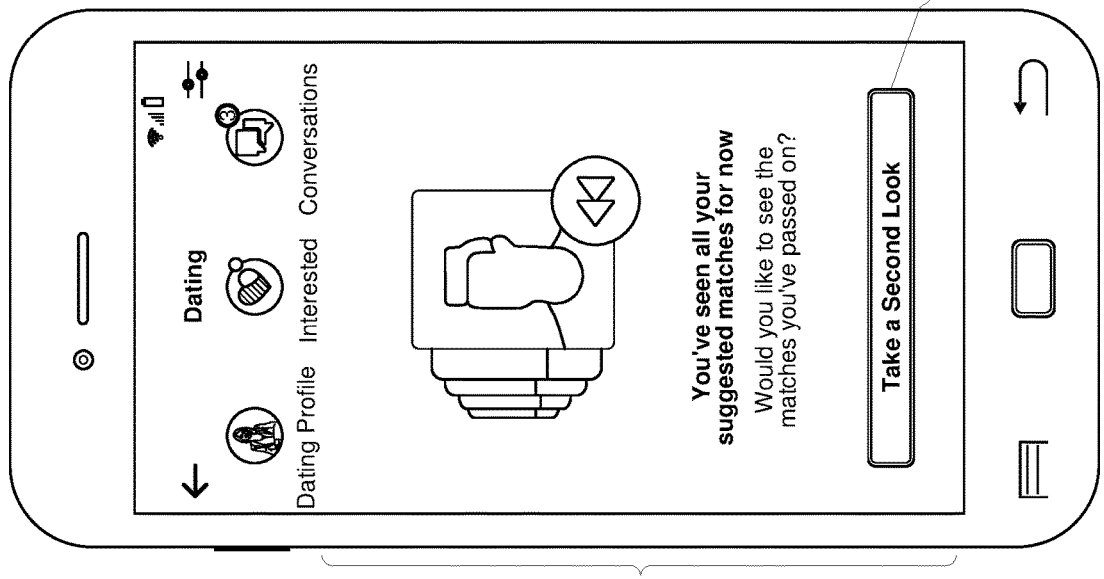

In some examples, the systems and methods disclosed herein may enable a user to decline, hide, or otherwise indicate a desire to not initiate a dating communication with an additional user that the dating service has identified as a potential match. However, the user may later wish to reexamine previous matches, perhaps in order to reevaluate the previous matches for potential dating compatibility. FIG. 16A, FIG. 16B, and FIG. 17 illustrate ways systems and methods disclosed herein may present a user with a reexamination control that, when selected, may cause one or more systems to present the user with information (e.g., a dating profile) associated with one or more additional users who the dating service previously identified as potentially compatible with the user, but whom the user may have previously declined to initiate a dating communication with. In some examples, the reexamination control may be included in a dating interface. In additional examples, the reexamination control may be included as part of an application management or "settings" interface.

One or more of modules 102 (e.g., selecting module 108, presenting module 110, etc.) may identify the set of declined participants associated with user 208 in the dating service. Each declined participant in the set of declined participants may be a participant in the dating service that the user has declined to participate with in a dating connection. One or more of modules 102 may then present a reexamination control within the dating interface and/or an application management interface. User 208 may select the reexamination control and one or more of modules 102 may receive a user selection of the reexamination control (e.g., as user selection 238). In response to receiving the user selection of the reexamination control, one or more of modules 102 (e.g., presenting module 110) may present, within the dating interface, dating information (e.g., dating profile information such as a name, an image, text, etc.) associated with the set of declined participants associated with the user in the dating service.

For example, returning to FIG. 10C, if a user is not interested in making a dating connection with additional participant Saleem, the user may select declination control 1022, which may cause one or more of the systems described herein to no longer present Saleem and/or Saleem's dating profile to the user and/or to add Saleem to a set of declined participants associated with the user. If the user selects a reexamination control, one or more of modules 102 (e.g., presenting module 110) may present dating information associated with Saleem (e.g., a dating profile) within a dating interface. In some examples, a dating interface that includes previously declined participants in this or similar fashion may be referred to as a second look interface.

FIG. 16A includes an interface view 1600 of a dating interface that may include a reexamination query 1602 and a reexamination control 1604. Reexamination query 1602 may include any information that may inform the user that he or she has seen all suggested matches for the user (e.g., within the dating service, within a particular interest-based community, etc.) and/or may present a query to the user of whether the user wishes to view previously declined participants (e.g., participants in the dating service that the user has previously passed on). Reexamination control 1604 may include any suitable interface element that user 208 may interact with. For example, reexamination control 1604 includes an interface button. A user (e.g., user 208) may interact with (e.g., touch, press, click on, etc.) reexamination control 1604. One or more of modules 102 (e.g., selecting module 108, presenting module 110, etc.) may receive the user selection of reexamination control 1604 in any suitable way. In response to receiving the user selection of reexamination control 1604, one or more of modules 102 (e.g., presenting module 110) may present, within a dating interface in response to receiving the user selection of reexamination control 1604, dating information associated with the set of declined participants associated with the user.

Continuing with the above example, if a user selects declination control 1022, one or more of modules 102 (e.g., selecting module 108, presenting module 110) may add and/or include user Saleem to a set of declined participants associated with user 208. When user 208 selects reexamination control 1604, one or more of the systems described herein (e.g., selecting module 108, presenting module 110) may identify the set of declined participants associated with user 208, receive the user selection of reexamination control 1604, and present dating information associated with user Saleem within a dating interface in any of the ways described herein.

Figure 16C:
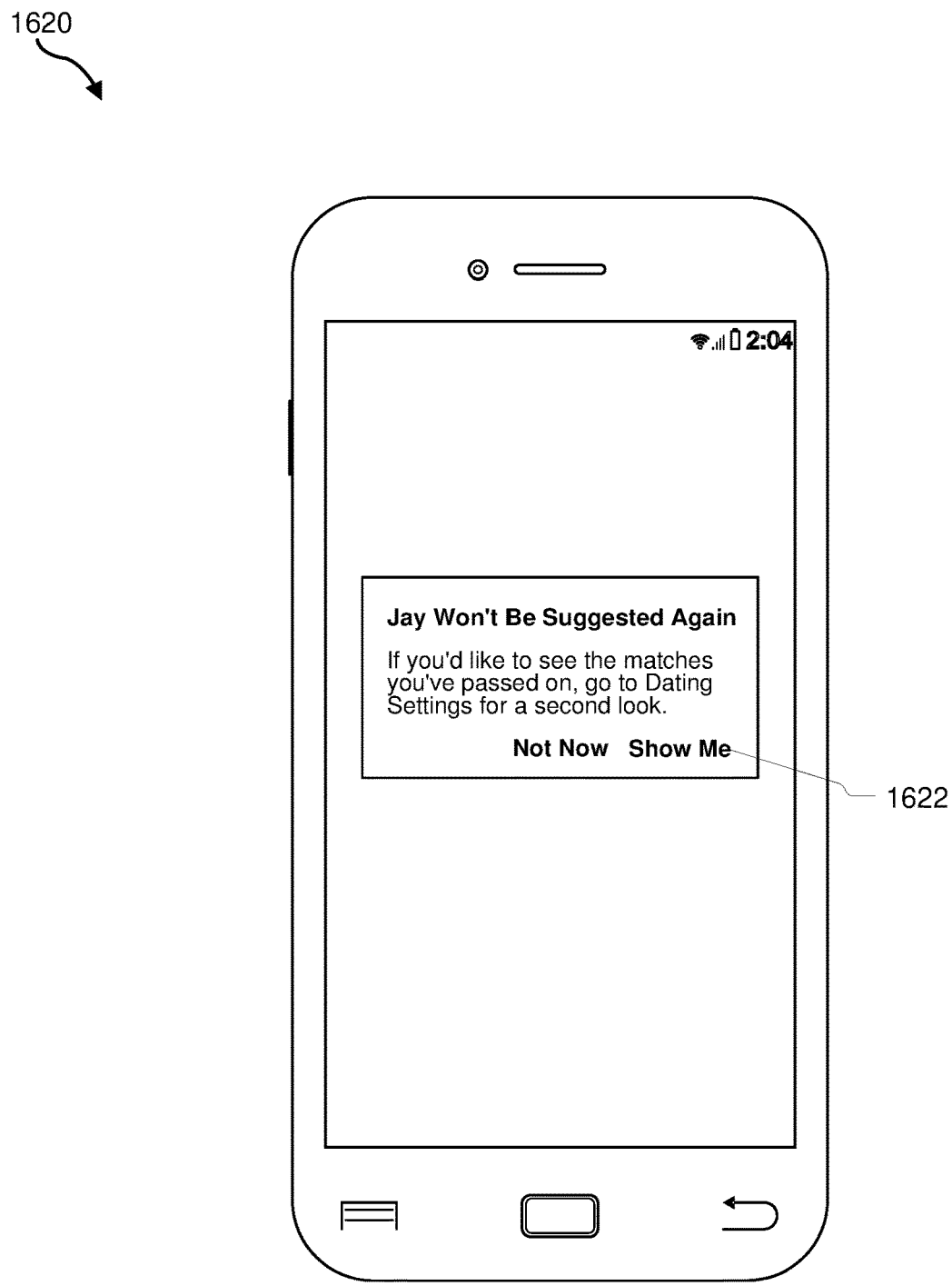

FIG. 16B and FIG. 16C show alternative ways that one or more of modules 102 may present a reexamination control. FIG. 16B shows a view 1610 of an application management interface that may include various management and/or configuration options for a dating service, a dating interface, and/or a social networking application that may provide an interface for a dating service of a social networking system. As shown, the application management interface includes a reexamination control 1612. A user may select reexamination control 1612, which may cause one or more of modules 102 (e.g., selecting module 108, presenting module 110, etc.) to receive a user selection of reexamination control 1612. Additionally, FIG. 16C shows a view 1620 of a dating interface that one or more of the systems described herein (e.g., one or more of modules 102) may present to a user after the user declines to participate in a dating connection with a participant. The user may select reexamination control 1622, which may cause one or more of modules 102 (e.g., selecting module 108, presenting module 110, etc.) to receive a user selection of reexamination control 1622.

In some examples, one or more of modules 102 may, once dating information associated with a participant is shown as a result of a user selecting a reexamination control (e.g., reexamination control 1604, reexamination control 1612, reexamination control 1622, etc.), the participant may be included in a set of repeatedly declined participants. In some examples, the set of repeatedly declined participants may be omitted from the set of declined participants, and hence may not be included in a second look interface.

Figure 17B:
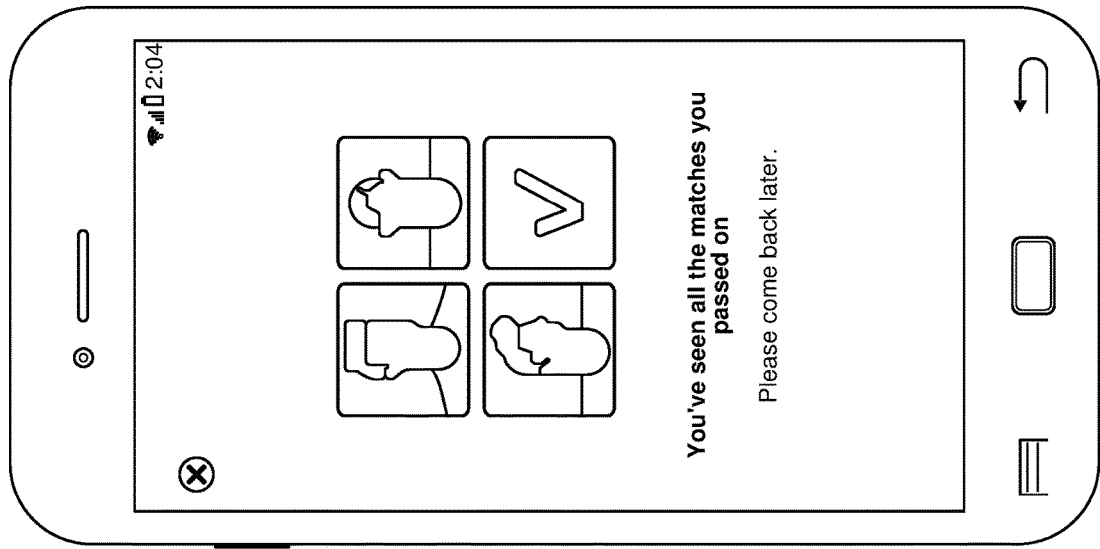
Figure 17A:
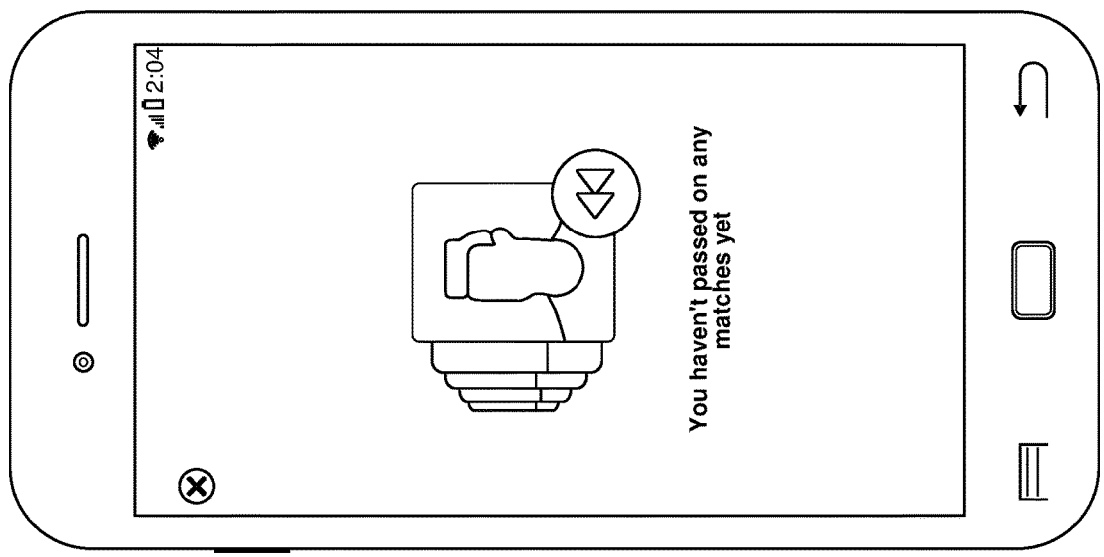

FIG. 17A and FIG. 17B show interface views that may be associated with the reexamination control and that one or more of modules 102 (e.g., presenting module 110) may present to a user. FIG. 17A shows an interface view 1700 that one or more of modules 102 (e.g., presenting module 110) may present to a user when the user has not yet passed on (e.g., declined) any potential matches (e.g., the set of declined participants is an empty set). FIG. 17B shows an interface view 1710 that one or more of modules 102 may present to a user after the user has passed a second time on (e.g., declined a second time) all potential matches included in the set of declined participants.

The disclosed systems and methods may provide one or more advantages over traditional options for making dating connections between users of a social networking system. For example, enabling a user of a social networking system to unlock dating features associated with various interest-based communities (e.g., groups, events, pages, etc.) of which they are already members, the systems and methods described herein may facilitate dating connections between members of interest-based communities of a social networking system who already share an interest in a subject associated with the interest-based community, such as a past, present, or future event, a topic of discussion, a subject, and so forth. As members of these interest-based communities may already share at least one common interest (e.g., an interest in a subject associated with the interest-based community), embodiments of the systems and methods described herein may enable members of interest-based communities who are interested in forming dating connections with other members of those communities to make stronger, longer-lasting, more enjoyable, and/or more fulfilling dating connections than may be possible through conventional dating services and/or traditional social networking systems.

Moreover, embodiments of the present disclosure may provide various features of a community-based dating service that may effectively facilitate formation of dating connections between community members. For example, an embodiment may limit dating-focused interactions between group members to "conversation-starter" messages and/or text-only messages. Additional embodiments may prevent members from sending repeated messages to disinterested members. These and other features provided by the systems and methods described herein may enable users to manage a degree, depth, and/or quality of their dating-focused interactions with other members, and/or an overall level of participation in the community-based dating feature.

Furthermore, additional embodiments and/or features of the community-based dating service may enable users to pause additional matches. Additional embodiments may further enable users to take a second look at potential matches the users may have previously passed on. These features may enable users to more efficiently and/or flexibly interact with potential matches within the community-based dating feature.

EXAMPLE EMBODIMENTS

Example 1

A computer-implemented method comprising (1) determining that a user of a social networking system is a participant in a dating service of the social networking system, (2) identifying a set of interest-based communities of the social networking system, wherein each interest-based community included in the set of interest-based communities comprises (a) the user as a member of the interest-based community, and (b) an activated community-based dating feature that facilitates dating connections between members of the interest-based community, (3) selecting a set of additional participants in the dating service, wherein each additional participant included in the set of additional participants is an additional member of at least one interest-based community included in the set of interest-based communities, and (4) presenting, within a dating interface of the social networking system, dating information associated with at least a portion of the set of additional participants.

Example 2

The computer-implemented method of example 1, wherein (1) the computer-implemented method further comprises: (a) presenting, within the dating interface of the social networking system, an activation control associated with a representation of an interest-based community included in the set of interest-based communities, and (b) receiving, via the activation control, a request from the user to include the interest-based community in the set of interest-based communities of the social networking system, and (2) selecting the set of additional participants comprises including, based on receiving the request from the user via the activation control, members of the interest-based community who are also participants in the dating service in the set of additional participants in the dating service.

Example 3

The computer-implemented method of any of examples 1 and 2, wherein selecting the set of additional participants in the dating service comprises, for each additional participant in the dating service who is also an additional member of at least one interest-based community included in the set of interest-based communities (1) determining whether the user and the additional participant have at least a threshold level of compatibility within the dating service, and (2) upon determining that the user and the additional participant have at least the threshold level of compatibility within the dating service, including the additional participant in the set of additional participants, and (3) upon determining that the user and the additional participant do not have at least the threshold level of compatibility within the dating service, excluding the additional participant from the set of additional participants.

Example 4

The computer-implemented method of any of examples 1-3, wherein selecting the set of additional participants in the dating service comprises (1) obtaining, from the user, data representative of at least one desired user attribute for new user connections, (2) for each member of the interest-based community included in the set of interest-based communities, determining whether the additional participant shares the desired user attribute, (3) upon determining that the additional participant shares the desired user attribute, including the additional participant in the set of additional participants, and (4) upon determining that the additional participant does not share the desired user attribute, excluding the additional participant from the set of additional participants.

Example 5

The computer-implemented method of any of examples 1-4, wherein presenting, within the dating interface of the social networking system, dating information associated with the portion of the set of additional participants comprises (1) presenting, within the dating interface of the social networking system, a representation of the set of interest-based communities, (2) receiving a user selection of an interest-based community included in the set of interest-based communities, (3) determining that an additional participant included in the set of additional participants is a member of the interest-based community, and (4) presenting an element of a dating profile associated with the additional participant within the dating interface.

Example 6

The computer-implemented method of example 5, wherein (1) the representation of the set of interest-based communities comprises an accordion container user interface element comprising a set of accordion label entries, wherein each accordion label entry included in the set of accordion label entries: (a) corresponds to a different interest-based community included in the set of interest-based communities, and (b) is associated with an expansion control, (2) receiving the user selection of the interest-based community included in the set of interest-based communities comprises receiving a user selection of the expansion control associated with the accordion label entry included in the set of accordion label entries, and (3) presenting the element of the dating profile associated with the additional participant within the dating interface comprises presenting the element of the dating profile within an accordion content element associated with the accordion label entry.

Example 7

The computer-implemented method of any of examples 5 and 6, wherein (1) the computer-implemented method further comprises identifying at least one mutual friend of the user and the additional participant within the social networking system, and (2) the element of the dating profile comprises a conversation starter element representative of the mutual friend.

Example 8

The computer-implemented method of any of examples 1-7, further comprising (1) identifying a set of declined participants associated with the user in the dating service, wherein each declined participant in the set of declined participants comprises a participant in the dating service that the user has declined to participate with in a dating connection, (2) presenting a reexamination control within at least one of: (a) the dating interface, or (b) an application management interface, (3) receiving a user selection of the reexamination control, and (4) presenting, within the dating interface in response to receiving the user selection of the reexamination control, dating information associated with the set of declined participants associated with the user in the dating service.

Example 9

The computer-implemented method of example 8, wherein (1) the dating interface further comprises a declination control associated with an additional participant included in the set of additional participants, wherein the declination control is selectable by the user to indicate that the user declines to participate in a dating connection with the additional participant, and (2) identifying the set of declined participants associated with the user in the dating service comprises: (a) receiving, via the declination control, an indication that the user declines to participate in the dating connection with the additional participant, and (b) including the additional participant in the set of declined participants associated with the user.

Example 10

The computer-implemented method of any of examples 1-9, further comprising (1) presenting a match pause control within at least one of: (a) the dating interface, or (b) an application management interface, and (2) receiving, via the match pause control, a match pause request via the match pause control, and (3) excluding dating information associated with a part of the set of additional participants from the dating interface in response to receiving the match pause request.

Example 11

The computer-implemented method of example 10, wherein excluding dating information associated with the part of the set of additional participants from the dating interface comprises (1) determining whether the user is engaged in a conversation via a messaging interface of the dating service with an additional participant included in the set of additional participants, (2) upon determining that the user is engaged in the conversation via the messaging interface of the dating service with the additional participant, including the additional participant in a set of conversation partners associated with the user, (3) upon determining that the user has not engaged in the conversation with the additional participant, including the additional participant in a set of potential matches associated with the user, (4) excluding dating information associated with the set of potential matches from the dating interface, and (5) presenting, within the messaging interface of the dating service, dating information associated with the set of conversation partners associated with the user.

Example 12

A system comprising (1) a determining module, stored in memory, that determines that a user of a social networking system is a participant in a dating service of the social networking system, (2) an identifying module, stored in memory, that identifies a set of interest-based communities of the social networking system, wherein each interest-based community included in the set of interest-based communities comprises: (a) the user as a member of the interest-based community, and (b) an activated community-based dating feature that facilitates dating connections between members of the interest-based community, (3) a selecting module, stored in memory, that a set of additional participants in the dating service, wherein each additional participant included in the set of additional participants is an additional member of the interest-based community included in the set of interest-based communities, (4) a presenting module, stored in memory, that presents, within a dating interface of the social networking system, dating information associated with at least a portion of the set of additional participants, and (5) at least one physical processor that executes the determining module, the identifying module, the selecting module, and the presenting module.

Example 13

The system of example 12, wherein (1) the presenting module further: (a) presents, within the dating interface of the social networking system, an activation control associated with a representation an interest-based community included in the set of interest-based communities, and (b) receives, via the activation control, a request from the user to include the interest-based community in the set of interest-based communities of the social networking system, and (2) the selecting module further selects the set of additional participants by including, based on receiving the request from the user via the activation control, members of the interest-based community who are also participants in the dating service in the set of additional participants in the dating service.

Example 14

The system of any of examples 12 and 13, wherein the selecting module selects the set of additional participants in the dating service by, for each participant in the dating service included in at least one interest-based community included in the set of interest-based communities (1) determining whether the user and the additional participant have at least a threshold level of compatibility within the dating service, and (2) upon determining that the user and the additional participant have at least the threshold level of compatibility within the dating service, including the additional participant in the set of additional participants, and (3) upon determining that the user and the additional participant do not have at least the threshold level of compatibility within the dating service, excluding the additional participant from the set of additional participants.

Example 15

The system of any of examples 12-14, wherein the presenting module further presents, within the dating interface of the social networking system, dating information associated with the portion of the set of additional participants by (1) presenting, within the dating interface of the social networking system, a representation of the set of interest-based communities, (2) receiving a selection of an interest-based community included in the set of interest-based communities from the user, (3) determining that an additional participant included in the set of additional participants is a community member of the interest-based community, and (4) presenting an element of a dating profile associated with the additional participant within the dating interface.

Example 16

The system of example 15, wherein (1) the presenting module further identifies at least one mutual friend of the user and the additional participant within the social networking system, and (2) the element of the dating profile comprises a conversation starter element representative of the mutual friend.

Example 17

The system of any of examples 12-16, wherein the presenting module further (1) identifies a set of declined participants associated with the user in the dating service, wherein each declined participant in the set of declined participants comprises a participant in the dating service that the user has declined to participate with in a dating connection, (2) presents a reexamination control within at least one of: (a) the dating interface, or (b) an application management interface, (3) receiving a user selection of the reexamination control, and (4) presents, within the dating interface in response to receiving the user selection of the reexamination control, dating information associated with the set of declined participants associated with the user in the dating service.

Example 18

The system of example 17, wherein (1) the dating interface further comprises a declination control associated with an additional participant included in the set of additional participants, wherein the declination control is selectable by the user to indicate that the user declines to participate in a dating connection with the additional participant, and (2) the presenting module further: (a) identifies the set of declined participants associated with the user in the dating service by (b) receiving, via the declination control, an indication that the user declines to participate in the dating connection with the additional participant, and (c) including the additional participant in the set of declined participants associated with the user.

Example 19

The system of any of examples 12-18, wherein the presenting module further (1) presents a match pause control within at least one of: (a) the dating interface, or (b) an application management interface, and (2) receives, via the match pause control, a match pause request from the user via the match pause control, and (3) excludes dating information associated with a part of the set of additional participants from the dating interface in response to receiving the match pause request.

Example 20

A non-transitory computer-readable medium comprising computer-readable instructions that, when executed by at least one processor of a computing system, cause the computing system to (1) determine that a user of a social networking system is a participant in a dating service of the social networking system, (2) identify a set of interest-based communities of the social networking system, wherein each interest-based community included in the set of interest-based communities comprises: (a) the user as a member of the interest-based community, and (b) an activated community-based dating feature that facilitates dating connections between members of the interest-based community, (3) select a set of additional participants in the dating service, wherein each additional participant included in the set of additional participants is an additional member of at least one interest-based community included in the set of interest-based communities, and (4) present, within a dating interface of the social networking system, dating information associated with at least a portion of the set of additional participants.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive participant data (e.g., one or more elements included in participant data 142) to be transformed, transform the participant data, output a result of the transformation to present the transformed participant data to a user (e.g., user 208), use the result of the transformation to identify one or more additional participants (e.g., one or more additional participants 216), and store the result of the transformation to later present the transformed participant data to one or more additional participants (e.g., one or more of additional participants 216). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining that a user of a computer-implemented social networking system is a participant in a dating service of the social networking system;
   identifying a set of interest-based communities maintained by the social networking system independently of the dating service, wherein each interest-based community included in the set of interest-based communities comprises:
   the user as a member of the interest-based community; and
   an activated community-based dating feature that enables the dating service to access data maintained by the social networking system and associated with members of the interest-based community who are also participants in the dating service;
   selecting a set of additional participants in the dating service, wherein:
   each additional participant included in the set of additional participants is an additional member of at least one interest-based community included in the set of interest-based communities; and
   the set of additional participants excludes members of the interest-based communities who are not participants in the dating service;
   transitioning from presenting a social networking interface of the social networking system to presenting a dating interface of the social networking system; and
   presenting, by a presenting module stored in memory and executed by a processor, within the dating interface of the social networking system, dating information associated with at least a portion of the set of additional participants by:
   presenting a graphical representation of the set of interest-based communities; and
   for at least one additional participant included in the set of additional participants, presenting a graphical representation of the additional participant included in a dating profile of the additional participant in visual association with a graphical representation of at least one interest-based community included in the set of interest-based communities.

2. The computer-implemented method of claim 1, wherein:
   the computer-implemented method further comprises:
   presenting, within the dating interface of the social networking system, an activation control associated with a representation of an interest-based community; and
   receiving, via the activation control, a request from the user to include the interest-based community in the set of interest-based communities of the social networking system; and
   selecting the set of additional participants comprises including, based on receiving the request from the user via the activation control, members of the interest-based community who are also participants in the dating service in the set of additional participants in the dating service.

3. The computer-implemented method of claim 1, wherein selecting the set of additional participants in the dating service comprises, for each additional participant in the dating service who is also an additional member of at least one interest-based community included in the set of interest-based communities:
   determining whether the user and the additional participant have at least a threshold level of compatibility within the dating service; and at least one of:
   upon determining that the user and the additional participant have at least the threshold level of compatibility within the dating service, including the additional participant in the set of additional participants; or
   upon determining that the user and the additional participant do not have at least the threshold level of compatibility within the dating service, excluding the additional participant from the set of additional participants.

4. The computer-implemented method of claim 1, wherein selecting the set of additional participants in the dating service comprises:
   obtaining, from the user, data representative of at least one desired user attribute for new user connections;
   for each member of the interest-based community included in the set of interest-based communities, determining whether the additional participant shares the at least one desired user attribute; and at least one of:
   upon determining that the additional participant shares the at least one desired user attribute, including the additional participant in the set of additional participants; or
   upon determining that the additional participant does not share the at least one desired user attribute, excluding the additional participant from the set of additional participants.

5. The computer-implemented method of claim 1, wherein presenting, within the dating interface of the social networking system, dating information associated with the portion of the set of additional participants further comprises:
   receiving a user selection of an interest-based community included in the set of interest-based communities;
   determining that an additional participant included in the set of additional participants is a member of the interest-based community; and
   presenting an element of a dating profile associated with the additional participant within the dating interface.

6. The computer-implemented method of claim 5, wherein:
   the representation of the set of interest-based communities comprises an accordion container user interface element comprising a set of accordion label entries, wherein each accordion label entry included in the set of accordion label entries:
   corresponds to a different interest-based community included in the set of interest-based communities; and
   is associated with an expansion control;
   receiving the user selection of the interest-based community included in the set of interest-based communities comprises receiving a user selection of the expansion control associated with the accordion label entry included in the set of accordion label entries; and
   presenting the element of the dating profile associated with the additional participant within the dating interface comprises presenting the element of the dating profile within an accordion content element associated with the accordion label entry.

7. The computer-implemented method of claim 5, wherein:
the computer-implemented method further comprises identifying at least one mutual friend of the user and the additional participant within the social networking system; and
the element of the dating profile comprises a conversation starter element representative of the at least one mutual friend.

8. The computer-implemented method of claim 1, further comprising:
identifying a set of declined participants associated with the user in the dating service, wherein each declined participant in the set of declined participants comprises a participant in the dating service that the user has declined to participate with in a dating connection;
presenting a reexamination control within at least one of:
the dating interface; or
an application management interface;
receiving a user selection of the reexamination control; and
presenting, within the dating interface in response to receiving the user selection of the reexamination control, dating information associated with the set of declined participants associated with the user in the dating service.

9. The computer-implemented method of claim 8, wherein:
the dating interface further comprises a declination control associated with an additional participant included in the set of additional participants, wherein the declination control is selectable by the user to indicate that the user declines to participate in a dating connection with the additional participant; and
identifying the set of declined participants associated with the user in the dating service comprises:
receiving, via the declination control, an indication that the user declines to participate in the dating connection with the additional participant; and
including the additional participant in the set of declined participants associated with the user.

10. The computer-implemented method of claim 1, further comprising:
presenting a match pause control within at least one of:
the dating interface; or
an application management interface; and
receiving, via the match pause control, a match pause request via the match pause control; and
excluding dating information associated with a part of the set of additional participants from the dating interface in response to receiving the match pause request.

11. The computer-implemented method of claim 10, wherein excluding dating information associated with the part of the set of additional participants from the dating interface comprises:
determining whether the user is engaged in a conversation via a messaging interface of the dating service with an additional participant included in the set of additional participants;
at least one of:
upon determining that the user is engaged in the conversation via the messaging interface of the dating service with the additional participant, including the additional participant in a set of conversation partners associated with the user; or
upon determining that the user has not engaged in the conversation with the additional participant, including the additional participant in a set of potential matches associated with the user;
excluding dating information associated with the set of potential matches from the dating interface; and
presenting, within the messaging interface of the dating service, dating information associated with the set of conversation partners associated with the user.

12. A system comprising:
a determining module, stored in memory, that determines that a user of a computer-implemented social networking system is a participant in a dating service of the social networking system;
an identifying module, stored in memory, that identifies a set of interest-based communities maintained by the social networking system independently of the dating service, wherein each interest-based community included in the set of interest-based communities comprises:
the user as a member of the interest-based community; and
an activated community-based dating feature that enables the dating service to access data maintained by the social networking system and associated with members of the interest-based community who are also participants in the dating service;
a selecting module, stored in memory, that selects a set of additional participants in the dating service, wherein:
each additional participant included in the set of additional participants is an additional member of the interest-based community included in the set of interest-based communities; and
the set of additional participants excludes members of the interest-based communities who are not participants in the dating service;
a presenting module, stored in memory, that:
transitions from presenting a social networking interface of the social networking system to presenting a dating interface of the social networking system; and
presents, within the dating interface of the social networking system, dating information associated with at least a portion of the set of additional participants by:
presenting a graphical representation of the set of interest-based communities; and
for at least one additional participant included in the set of additional participants, presenting a graphical representation of the additional participant included in a dating profile of the additional participant in visual association with a graphical representation of at least one interest-based community included in the set of interest-based communities; and
at least one physical processor that executes the determining module, the identifying module, the selecting module, and the presenting module.

13. The system of claim 12, wherein:
the presenting module further:
presents, within the dating interface of the social networking system, an activation control associated with a representation an interest-based community; and
receives, via the activation control, a request from the user to include the interest-based community in the set of interest-based communities of the social networking system; and
the selecting module further selects the set of additional participants by including, based on receiving the request from the user via the activation control, members of the interest-based community who are also participants in the dating service in the set of additional participants in the dating service.

14. The system of claim 12, wherein the selecting module selects the set of additional participants in the dating service by, for each participant in the dating service included in at least one interest-based community included in the set of interest-based communities:
   determining whether the user and the additional participant have at least a threshold level of compatibility within the dating service; and at least one of:
   upon determining that the user and the additional participant have at least the threshold level of compatibility within the dating service, including the additional participant in the set of additional participants; or
   upon determining that the user and the additional participant do not have at least the threshold level of compatibility within the dating service, excluding the additional participant from the set of additional participants.

15. The system of claim 12, wherein the presenting module further presents, within the dating interface of the social networking system, dating information associated with the portion of the set of additional participants by further:
   receiving a selection of an interest-based community included in the set of interest-based communities from the user;
   determining that an additional participant included in the set of additional participants is a community member of the interest-based community; and
   presenting an element of a dating profile associated with the additional participant within the dating interface.

16. The system of claim 15, wherein:
   the presenting module further identifies at least one mutual friend of the user and the additional participant within the social networking system; and
   the element of the dating profile comprises a conversation starter element representative of the mutual friend.

17. The system of claim 12, wherein the presenting module further:
   identifies a set of declined participants associated with the user in the dating service, wherein each declined participant in the set of declined participants comprises a participant in the dating service that the user has declined to participate with in a dating connection;
   presents a reexamination control within at least one of:
      the dating interface; or
      an application management interface;
   receiving a user selection of the reexamination control; and
   presents, within the dating interface in response to receiving the user selection of the reexamination control, dating information associated with the set of declined participants associated with the user in the dating service.

18. The system of claim 17, wherein:
   the dating interface further comprises a declination control associated with an additional participant included in the set of additional participants, wherein the declination control is selectable by the user to indicate that the user declines to participate in a dating connection with the additional participant; and the presenting module further:
   identifies the set of declined participants associated with the user in the dating service by:
      receiving, via the declination control, an indication that the user declines to participate in the dating connection with the additional participant; and
      including the additional participant in the set of declined participants associated with the user.

19. The system of claim 12, wherein the presenting module further:
   presents a match pause control within at least one of:
      the dating interface; or
      an application management interface; and
   receives, via the match pause control, a match pause request from the user via the match pause control; and
   excludes dating information associated with a part of the set of additional participants from the dating interface in response to receiving the match pause request.

20. A non-transitory computer-readable medium comprising computer-readable instructions that, when executed by at least one processor of a computing system, cause the computing system to:
   determine that a user of a computer-implemented social networking system is a participant in a dating service of the social networking system;
   identify a set of interest-based communities maintained by the social networking system independently of the dating service, wherein each interest-based community included in the set of interest-based communities comprises:
      the user as a member of the interest-based community; and
      an activated community-based dating feature that enables the dating service to access data maintained by the social networking system and associated with members of the interest-based community who are also participants in the dating service;
   select a set of additional participants in the dating service, wherein:
      each additional participant included in the set of additional participants is an additional member of at least one interest-based community included in the set of interest-based communities; and
      the set of additional participants excludes members of the interest-based communities who are not participants in the dating service;
   transition from presenting a social networking interface of the social networking interface of the social networking system to presenting a dating interface of the social networking system; and
   present, within the dating interface of the social networking system, dating information associated with at least a portion of the set of additional participants by:
      presenting a graphical representation of the set of interest-based communities; and
      for at least one additional participant included in the set of additional participants, presenting a graphical representation of the additional participant included in a dating profile of the additional participant in visual association with a graphical representation of at least one interest-based community included in the set of interest-based communities.

* * * * *